United States Patent
Kremer

(10) Patent No.: US 10,184,229 B2
(45) Date of Patent: Jan. 22, 2019

(54) APPARATUS, SYSTEM AND METHOD FOR UTILIZING THERMAL ENERGY

(71) Applicant: Robert Kremer, New York, NY (US)

(72) Inventor: Robert Kremer, New York, NY (US)

(73) Assignee: Robert Kremer, New York, NY (US)

( * ) Notice: Subject to any disclaimer, the term of this patent is extended or adjusted under 35 U.S.C. 154(b) by 680 days.

(21) Appl. No.: 14/755,245

(22) Filed: Jun. 30, 2015

(65) Prior Publication Data

US 2016/0053469 A1    Feb. 25, 2016

Related U.S. Application Data

(63) Continuation-in-part of application No. 13/191,550, filed on Jul. 27, 2011, now Pat. No. 9,739,508.

(60) Provisional application No. 61/369,110, filed on Jul. 30, 2010, provisional application No. 62/019,091, filed on Jun. 30, 2014.

(51) Int. Cl.
| | |
|---|---|
| *F01D 1/32* | (2006.01) |
| *E03B 11/16* | (2006.01) |
| *B01F 5/04* | (2006.01) |
| *F24J 3/00* | (2006.01) |
| *F28F 13/06* | (2006.01) |
| *F24H 4/04* | (2006.01) |

(Continued)

(52) U.S. Cl.
CPC ............ *E03B 11/16* (2013.01); *B01F 5/0416* (2013.01); *B01F 5/0423* (2013.01); *B01F 5/0428* (2013.01); *F01K 13/00* (2013.01); *F24H 4/04* (2013.01); *F24J 3/006* (2013.01); *F28F 13/06* (2013.01); *F24J 3/083* (2013.01); *Y02E 10/125* (2013.01); *Y10T 137/85978* (2015.04)

(58) Field of Classification Search
CPC ......... B01F 5/0416; F01K 13/00; F24J 3/006; F01D 1/32; F05D 2240/242; F05B 224/242
See application file for complete search history.

(56) References Cited

U.S. PATENT DOCUMENTS

| | | | |
|---|---|---|---|
| 171,256 A | * 12/1875 | Backus | ...... F03B 1/04 415/63 |
| 305,575 A | * 9/1884 | Culver | ...... F03B 3/08 415/188 |

(Continued)

FOREIGN PATENT DOCUMENTS

| | | |
|---|---|---|
| CA | 451981 | 7/1946 |
| CN | 1239194 | 12/1999 |

(Continued)

OTHER PUBLICATIONS

Fisenko, V. et al, Industrial Applications of Fisonic Devices, Jan. 2010, HFC Corp. http://www.fisonic.us/presentations/FISONIC_WHITE_PAPER.pdf retrieved Jun. 17, 2015.

(Continued)

*Primary Examiner* — Avinash Savani
*Assistant Examiner* — Deepak Deean
(74) *Attorney, Agent, or Firm* — Cantor Colburn LLP

(57) ABSTRACT

A transonic two-phase reaction turbine for use with low and high temperature fluid flow mediums includes at least two wheels that are configured to rotate in opposite directions, at least one of the at least two wheels being equipped with one or multiple kinetic energy harvesters.

13 Claims, 35 Drawing Sheets

(51) Int. Cl.
*F01K 13/00* (2006.01)
*F24J 3/08* (2006.01)

(56) References Cited

U.S. PATENT DOCUMENTS

| | | | |
|---|---|---|---|
| 1,026,399 A | | 5/1912 | Koerting |
| 1,111,541 A | | 9/1914 | Koerting |
| 2,004,840 A | * | 6/1935 | Suchtelen ........... B01F 3/04028 |
| | | | 159/4.04 |
| 2,060,414 A | * | 11/1936 | Fladeland ................ F03B 3/00 |
| | | | 415/69 |
| 2,675,358 A | | 4/1954 | Fenley, Jr. |
| 3,045,481 A | | 7/1962 | Bunt et al. |
| 3,064,878 A | | 11/1962 | Bayles et al. |
| 3,074,697 A | | 1/1963 | Friedell |
| 3,200,764 A | | 8/1965 | Saunders |
| 3,677,503 A | | 7/1972 | Freeman, Jr. |
| 3,774,846 A | | 11/1973 | Schurig et al. |
| 3,926,534 A | * | 12/1975 | Erickson ................ F04D 1/12 |
| | | | 415/80 |
| 3,934,799 A | | 1/1976 | Hull |
| 4,059,961 A | * | 11/1977 | de la Parra ............. F01D 1/32 |
| | | | 60/325 |
| 4,379,679 A | | 4/1983 | Guile |
| 4,391,102 A | | 7/1983 | Studhalter et al. |
| 4,634,559 A | | 1/1987 | Eckert |
| 4,765,148 A | | 8/1988 | Ohashi |
| 5,037,585 A | | 8/1991 | Alix et al. |
| 5,176,447 A | * | 1/1993 | Bata .................... B01F 3/04531 |
| | | | 261/25 |
| 5,205,648 A | | 4/1993 | Fissenko |
| 5,275,486 A | | 1/1994 | Fissenko |
| 5,338,113 A | | 8/1994 | Fissenko |
| 5,408,824 A | | 4/1995 | Schlote |
| 5,544,961 A | | 8/1996 | Fuks et al. |
| 5,931,643 A | | 8/1999 | Skaggs |
| 6,427,724 B2 | | 8/2002 | Hua |
| 6,523,991 B1 | | 2/2003 | Maklad |
| 7,930,875 B2 | * | 4/2011 | Yamamoto ............... F01D 1/32 |
| | | | 415/80 |
| 8,193,395 B2 | | 6/2012 | Fenton et al. |
| 8,419,378 B2 | | 4/2013 | Fenton et al. |
| 2004/0141410 A1 | | 7/2004 | Fenton et al. |
| 2008/0054645 A1 | | 3/2008 | Kulkarni et al. |
| 2012/0186672 A1 | | 7/2012 | Fisenko et al. |
| 2012/0248213 A1 | | 10/2012 | Kremer et al. |
| 2013/0264829 A1 | | 10/2013 | Jordan, Sr. |
| 2013/0305699 A1 | | 11/2013 | Brissett |

FOREIGN PATENT DOCUMENTS

| | | |
|---|---|---|
| RU | 2045715 | 10/1995 |
| RU | 2061195 | 5/1996 |
| RU | 2114326 | 6/1998 |
| RU | 2115027 | 7/1998 |
| RU | 2127832 | 3/1999 |
| RU | 2132517 | 6/1999 |
| RU | 2142604 | 12/1999 |
| RU | 2221935 | 1/2004 |
| RU | 2263826 | 11/2005 |
| SU | 1290015 | 2/1987 |
| TW | 200631910 A | 9/2006 |
| WO | 9856495 | 12/1998 |
| WO | 2012003706 A1 | 1/2012 |
| WO | 2012015742 A2 | 2/2012 |

OTHER PUBLICATIONS http://www.alibaba.com/product-gs/418103756/KUHO_125_Variable_speed_of_sound.html; Jul. 25, 2011; pp. 1-41.
International Search Report and Written Opinion dated Feb. 27, 2012 for International Application PCT/US2011/045192; 5 pgs.
International Search Report and Written Opinion dated Sep. 29, 2015 for International Application PCT/US15/38509; 10 pgs.
Oliker, I., "Use of Fisonic Devices in Con Edison Service Territory," NYSERDA Jan. 2009; 77 pgs.
Eurasian Office Action for Patent Application No. 201790059 based on PCT/US2015/038509; dated Jun. 14, 2018; Received Jul. 13, 2018; which is related to U.S. Appl. No. 14/755,245; 3 pages.
Supplementary Search Report for Application No. EP15814674 which is related to U.S. Appl. No. 14/755,245; Report dated Mar. 1, 2018; Report Received Date: Mar. 26, 2018; 3 pages.
Written Opinion for Application No. EP15814674 which is related to U.S. Appl. No. 14/755,245; Report dated Mar. 1, 2018; Report Received Date: Mar. 26, 2018; 4 pages.

\* cited by examiner

APPARATUS, SYSTEM AND METHOD FOR UTILIZING THERMAL ENERGY

CROSS REFERENCE TO RELATED APPLICATIONS

This application is a continuation-in-part application of U.S. application Ser. No. 13/191,550, filed Jul. 27, 2011, which claims priority to U.S. Provisional Application Ser. No. 61/369,110, filed on Jul. 30, 2010, and also claims priority to Provisional Application Ser. No. 62/019,091, filed Jun. 30, 2014, the contents of which are incorporated herein in their entirety.

BACKGROUND OF THE INVENTION

The invention relates to the field of kinetic energy and thermal energy harvesting, mixing, vacuum and pumping technology, in which it is possible to organize the process of efficient kinetic and thermal energy harvesting and create thrust and vacuum by utilizing the interparticle kinetic energy of the liquids in a closed or an open loop.

Known method of heating liquids, includes an electric or steam driven pump, indirect and direct contact heat exchangers and jet apparatuses supplied with thermal energy from boilers or district energy systems, where liquids are heated by steam or hot water supply (see for example Reference-1: Oliker, I. Demonstration of Performance and Energy Efficiency of Fisonic Devices at the Con Edison Test Facility, NYSERDA Report #20346). The heated water is transported to the consumers (end users). After transferring the heating energy to the user, the cooled liquid/condensate collected in condenser and is transported in a closed loop back to the heat source by the pump and the cycle repeats again. Make-up fluid is provided to the system when the fluid is not returned from the end user. This method consumes a substantial amount of thermal and pumping energy for heating and transportation of the liquid.

Many jet-type devices for heating and transporting liquids, steam, gases and solid materials are used in the industry. These jet-type devices include Venturi de-superheaters, steam ejectors, jet exhausters and compressors, jet eductors and jet vacuum pumps.

The typical jet-type device consists of three principal parts: a converging (working) nozzle surrounded by a suction chamber, mixing nozzle and a diffuser. The working (motive) and injected (entrained) streams enter into the mixing nozzle where the velocities are equalized by exchange of energy and the pressure of the mixture is increased. From the mixing nozzle or multiple nozzles the combined stream enters the diffuser where the pressure is further increased. The diffuser is so shaped that it gradually reduces the velocity and converts the energy to the discharge pressure with as little loss as possible. The jet-type device transforms the kinetic energy of the working stream to the injected stream by direct contact without consumption of mechanical energy. The jet-type devices operate with high expansion and moderate or high compression ratios and require a continuous motive force.

During the interaction of two streams with various velocities an increase in entropy of the mixed stream takes place (as compared with an invertible mixing), resulting in the reduction of the pressure of the discharged stream. Therefore, typically the discharge pressure of the jet-type device is higher than the pressure of the injected stream but lower than the pressure of the working stream.

The disadvantage of jet-type devices is that jet-type devices use high level kinetic motive force to perform work, which degrades the outlet pressures, drastically reduces the effectiveness of initial energy input ratios and requires a continuous motive force. Therefore these devices cannot be used to escalate pressure to a higher output level. Other devices, such as devices that operate based on what is known as Fisonic technology can utilize a lower energy input and escalate the initial thrust and thermal load. Fisonic technology design achieves this by exploiting the two-phase flow's very low Mach number and harvesting a minute amount (<0.1%) of the system's thermal energy and converting it to kinetic thrust.

In the Fisonic device ("FD device") the injected water/fluid enters the mixing chamber with high velocity in parallel with the velocity of the working stream. The injected water/fluid is typically supplied through a narrow circumferential channel surrounding the working nozzle. The mixing chamber typically has a conical shape. The optimized internal geometry of the FD device causes the working and the injected streams to mix and accelerate, creating transonic conditions, breaking the stream into tiny particles and changing the state of the mixing streams into plasma conditions, and finally converting the minute fractions of the streams thermal energy to physical trust (pump head) with the discharge pressure higher than the pressure of the mixing streams. The main reason behind this phenomenon is the high compressibility of homogeneous two-phase flows. It was demonstrated that uniform two-phase flows have more compressibility than the flows of pure gases. Hence the possibilities of the more effective conversion of thermal energy into the mechanical work in uniform two-phase mixtures especially in the transonic or supersonic modes.

The sonic speed in such systems is much lower than the sonic speed in liquids and in gas. As one can see from FIG. 1 the minimum sonic velocity takes place at the volumetric ratio of the streams of 0.5). The important feature of the FD device is also the independence of the discharge flow from the changing parameters of the end user system downstream (such as back pressure), indicating that the FD device creates supersonic flow and there is no downstream communication past the Mach barrier (or upstream either).

Referring to FIG. 1 it may be seen that when there is no liquid—the ratio equals one, if there is no gas—the ratio β equals zero. When there is 50% liquid and 50% gas (two phase flow)—the ratio β is equal 0.5 and the sonic velocity is much lower than in gases and liquids. The equation of sonic speed is as follows:

$$S^2 = \frac{kP}{\rho} \tag{1}$$

Where: k=isentropic exponent, equal to the ratio of specific heats; P=pressure; ρ=density of the medium. For determining the isentropic exponent, the following equation was developed:

$$\frac{k_g(k+1) - 2k}{k_g - 1} = k\beta\left[1 + \left(\frac{1}{\beta} - 1\right)^2\right] - 2\left(\frac{1}{\beta} - 1\right)\left(\frac{1}{\varepsilon} - 1\right) \tag{2}$$

Where: $k_g$=isentropic exponent of as in the mixture; ε=critical ratio of pressures.

As the result of exchange of motion impulses between the working and injected streams, the sonic velocity in the mixing chamber is reduced. The stream at the entrance to the mixing chamber (throat) has a velocity equal to or larger than the local sonic velocity. As the result of the stream deceleration the temperature and pressure at the exit of the mixing chamber increase. The pressure becomes higher than the saturation pressure at the saturation temperature of the mixture. At the specific design geometry, the discharge pressure can increase by few times higher than the pressure of the working media. The liquid phase in the mixing chamber has a foam type (plasma) structure with a very highly turbulized surface area, therefore the dimensions of the FD device are very small when compared with conventional surface type heat exchangers. It should be indicated that the FD is a constant flow device.

Substantial differences in the above described process take place at small injection coefficients. The reduction of the flow rate of the injected water/fluids at the constant steam flow rate leads to the increase of the water temperature to the saturation temperature corresponding to the pressure in the mixing chamber and, because of the shortage of water for condensation of all steam, while the FD device's heat exchange operation continues, its pumping performance is proportionally reduced. This mode determines the minimum injection coefficient. At this mode the operational and geometry factors influence the characteristics of the FD device. With the increase of the injection coefficient, when the flow rate of the injected water (as the result of the reduction of back pressure) is increased, the water temperature in the mixing chamber is reduced. At the same time because of velocity increase in the mixing chamber the water pressure is reduced. The increase of the flow rate of injected water leads to the reduction of the pressure at the entrance into mixing chamber up to the saturated pressure corresponding to the temperature of the heated water. Reduction of the backpressure doesn't cause the increase of the water flow rate because further pressure drop in the mixing chamber is impossible. This pressure drop which determines the flow rate of the injected water can't be increased. Further reduction of backpressure at this conditions leads to flashing of the water at the mixing chamber.

The cavitation of water in the mixing chamber determines the maximum (limiting) injection coefficient. It should be noted that this operational condition is the working mode of the FD. The FD operates with high expansion and small compression ratios.

Recent analysis and testing of FD's resulted in a conclusion that conversion of the internal (interparticle) energy of overheated liquid into the work can be achieved both with the presence of a "cold" heat-transfer agent and without it. Furthermore, under specific pressure values at the entrance into the apparatus and specific internal geometric parameters, the "cold" liquid itself becomes the two-phase medium before the pressure jump. From this phenomenon follows a principally important conclusion that under the desired conditions the internal (interparticle kinetic) energy of liquid could be transformed into useful work.

In addition to the foregoing, other subject matter disclosed herein relates to the production of mechanical work and in particular to direct contact heat exchangers producing heat, and hydraulic, pneumatic and steam turbines for driving electrical generators, hydraulic pumps, compressors, heat and two-phase pumps.

Many buildings in the United States and around the world use steam for space heating, cooling and domestic hot water supply. The steam condensate is sometimes returned to the steam generating source or discharged to the city sewer system. In order to reduce the condensate temperature from 220 F to about 110 F (the city sewer requirement) the condensate is mixed with cold potable water. Such systems operate with substantial electric, heat and water losses and sewer discharge rate. All discharge rates are assessed and paid for.

Existing alternative sources for waste water use for electricity production include geothermal, solar thermal and bottoming cycles of large steam (fossil and nuclear), reciprocating internal combustion and diesel power plants, chemical processes, and various industries. Typically, the energy in boiling waste water is transferred to a thermodynamic working fluid (binary cycles) to generate electrical power. Because the water or other waste streams are only under moderately high temperature and pressure, the working fluids operate in the two-phase region with low energy conversion efficiency (15 to 20%) and often suffer from poor durability.

In 2000 the California Energy Commission sponsored a project (CEC-500-2005-079) which briefly (for operational intervals of minutes) demonstrated that a two-phase turbine with a long curved reaction expansion nozzle could operate at turbine efficiency close to 50%. The turbine used water heated to 435° F. and 350 psig. The principal difference of the proposed invention from the above turbine is the use of low temperature readily available renewable waste liquids and gases and application of advanced transonic nozzles capable of creating very high discharge pressure trust.

A two-phase reaction turbine for obtaining mechanical energy is known, which includes a radially outward flow turbine having a rotor with nozzles which extend from an inner inlet passage to the rotor periphery with a substantially constant pressure drop per unit length of nozzle, with a first order surface continuity along the surface of each nozzle and with a nozzle profile which allows two-phase flow without substantial lateral acceleration. The turbine also has an outer casing which is rotated by flow entering the casing openings creating an additional mechanical work.

The known reaction turbine has the disadvantage that it is not possible to obtain the maximum mechanical energy for the turbine from its rotor, since the torque generated in the rotor during flowing out of the working medium from its channels is limited by the discharge pressure of the environment.

A two-phase reaction turbine for obtaining a mechanical energy is known, which includes supplying a working medium into the channel of the rotor of the turbine and acceleration of the working medium during flowing out from the channels in one direction along a circumference perpendicular to the radius of the rotor with providing of rotation of the rotor.

The disadvantage of this known method is insufficiently high quantity of obtained mechanical energy because during the flowing out of the working medium through four channels of the rotor and its supply into a space formed by the casing in the form of the blade turbine around the rotor and flowing out through the openings in the casing between the instant of the turbine, the working medium located between the blades in instant of contact with streams of channels of the rotor is expelled, "knocked out", being accelerated to the speed of the stream from the channels of the rotor, for which a part of energy of the stream is used. During flowing out through the openings in the casing in the form of a radial blade turbine, there are losses for acceleration of the working medium in radial blades from centrifugal forces. In addition, there are losses for ventilation during circulation of the working medium between the blades due to flowing out through openings in the casing. Also, from the rotating casing in the form of a radial blade turbine, the working medium flows out with a speed which is significantly different from the speed of rotation of the casing, which leads to losses of energy.

A jet reaction turbine is also known, which has a working wheel formed as a tube with a closed end, connected coaxially with the shaft, arranged with a possibility of rotation, with at least one pair of pipe with open ends radially fixed on the tube at opposite sides, a casing arranged with the possibility of rotation and surrounding the wheel, a housing which surrounds the wheel and the casing and has openings for arrangement of the shaft, and nozzles for supplying and discharging of the working medium. At least one pair of pipes with open ends is fixed on the casing at the opposite sides. The casing and the working wheel are arranged on the same shaft.

The disadvantage of this known turbine is its fixed connection of the casing and the working wheel arranged on the single shaft, and to rotation of the working wheel and the casing in one direction, that provides obtaining of mechanical energy only from one casing, while pipes of the working wheel are only throttling the pressure of supply of the working medium by the elements of the turbine, which leads to useless losses of energy and low turbine efficiency.

A radial turbine with two shafts is known, which has a Segner wheel formed as a tube with a closed end connected coaxially with the shaft and arranged with the possibility of rotation, at least one pair of pipes fixed on the tube radially at opposite sides and having open ends which are bent in opposite sides from their axes, wherein the axes of the bent open ends of the pipes are perpendicular to a plane extending through the axes of the pair of pipes and the axis of the tube, wherein in a wall of the pipe openings corresponding to the pipes are provided, a casing is connected coaxially with the shaft and arranged with the possibility of rotation and surrounding the Segner wheel, a housing surrounding the Segner wheel and the casing with openings for arranging the tube of the Segner wheel and shafts of the Segner wheel and the casing, and a nozzle for flowing out of a working medium. The casing is formed as a blade turbine.

The disadvantage of this known turbine is that in the casing formed as a blade turbine the blades are fixed to the disc along its end, which increases a centrifugal load on the blades due to an additional moment and an assembly of fixing of the blades is incapable of bearing a high load, that requires a reduction of circumferential speeds of the blade turbine and decreases the efficiency of the blade turbine. For passage between the blades, a stream of the working medium from the nozzles of the rotor must be directed to the blades at a certain angle which is determined by the shape of the blades and the shape of the stream from the nozzles. In the known turbine the stream of the working medium from the nozzles is supplied onto the blades under different angles, which on an average leads to increased angles acceptable to the turbines with a separate nozzle apparatus and to decrease of the efficiency.

The use of a hollow rotor (Segner wheel) leads to losses for friction due to generation in a hollow of the rotor a circulation of the working medium which is entrained due to viscosity on the walls and an opposite flow in a medium part of the hollow of the rotor (Segner wheel), or in other words the formation of a pair whirl. As a result the power taken from the rotor with the hollow is lost. With a partial supply of a working medium to the casing (blade turbine) from four nozzles of the rotor (Segner wheel), which rotates in an opposite direction, the working medium located between the blades at a low pressure in a moment of contact with the streams from the nozzles of the rotor, is expelled, "knocked out", being accelerated to a speed of the stream supplied from the nozzles of the rotor, for which a part of the energy of the stream is used.

In the casing (blade turbine) there are losses for acceleration of the working medium in radial blades from centrifugal forces. In addition, there are losses for ventilation due to circulation or the working medium between the blades during flowing out through the openings in the casing. Also, from the rotating casing in form of a blade turbine, the working medium flows out with a speed which significantly differs from the speed of rotation of the casing, which leads to energy losses.

The known turbine also has a complicated construction and a complicated technology for its manufacture due to the use of a blade turbine as a casing.

A method of obtaining mechanical energy from a turbine is known, which includes supplying a working medium into channels of a rotor of a turbine, accelerating the working medium while flowing out from the channels in one direction along a circumference and normally to a radius of a rotor so as to make the rotor rotate, supplying the working fluid from the rotor channels into a space created within a casing above the rotor where it interacts by friction with the casing while flowing out through openings of the casing so as to accelerate in one direction and to make the casing rotate, forming the space in the casing closed and extending along a radius of the circumference along outlet openings of the rotor channels, and accelerating the working fluid flowing out through the openings of the casing along a circumference and normally to a radius of the casing in a direction opposite to a direction of flowing out from the rotor.

The disadvantage of this known method is insufficient high quantity of obtained mechanical energy because the nozzles are not of transonic type and do not provide additional thrust.

While existing systems described above are suitable for their intended purposes, improvements remain in the harvesting of thermal energy of the liquid while improving the efficiency of heat harvesting and providing reliable and stable operation of the system in a wide range of operating parameters, and while existing hot water and condensate collection systems are suitable for their intended purposes, the need for improvement remains, particularly in providing a system that improves the overall cycle thermal efficiency.

BRIEF DESCRIPTION OF THE INVENTION

An embodiment of the invention includes a transonic two-phase reaction turbine for use with low and high temperature fluid flow mediums. The turbine includes at least two wheels that are configured to rotate in opposite directions, at least one of the at least two wheels being equipped with one or multiple kinetic energy harvesters.

An embodiment of the invention includes a transonic two-phase reaction turbine having at least one rotor having a plurality of kinetic energy harvesters. Each kinetic energy harvester is disposed and configured to receive a first heat carrier or heat carriers under pressure into a first nozzle, and to receive a second heat carrier into a second nozzle, the second heat carrier being colder than the first heat carrier, the second nozzle being disposed downstream of the first nozzle at a defined distance based at least in part on a flow, pressure and temperature of the heat carrier or heat carriers. Each kinetic energy harvester includes a mixing chamber between the first nozzle and the second nozzle configured to mix the first heat carrier and the second heat carrier to produce a two-phase mixture, the second nozzle being placed at the defined distance from the first nozzle for producing an elevated discharge thrust. Each mixing chamber is configured to cause a pressure drop and deceleration of the heat carriers of the two-phase mixture to a velocity at which the two-phase mixture or at least one of the first heat carrier or the second heat carrier, or both, boils into a homogeneous two-phase medium with small bubbles, being highly compressible medium and with sonic condition of Mach number of more than 1. Each second nozzle is configured to converge and compress the two-phase medium flow, collapsing the small bubbles and changing the two-phase mixture into a non-compressible single-phase flow medium having increased kinetic thrust. Each kinetic energy harvester further includes a discharge section disposed downstream of the second nozzle, each discharge section being disposed and configured to discharge the single-phase flow medium having increased kinetic thrust to produce a reactionary pressure, higher than both input pressures of the first and second heat carriers, to drive the rotor in a rotational manner, wherein as a result each kinetic energy harvester produces thermal and kinetic energy.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
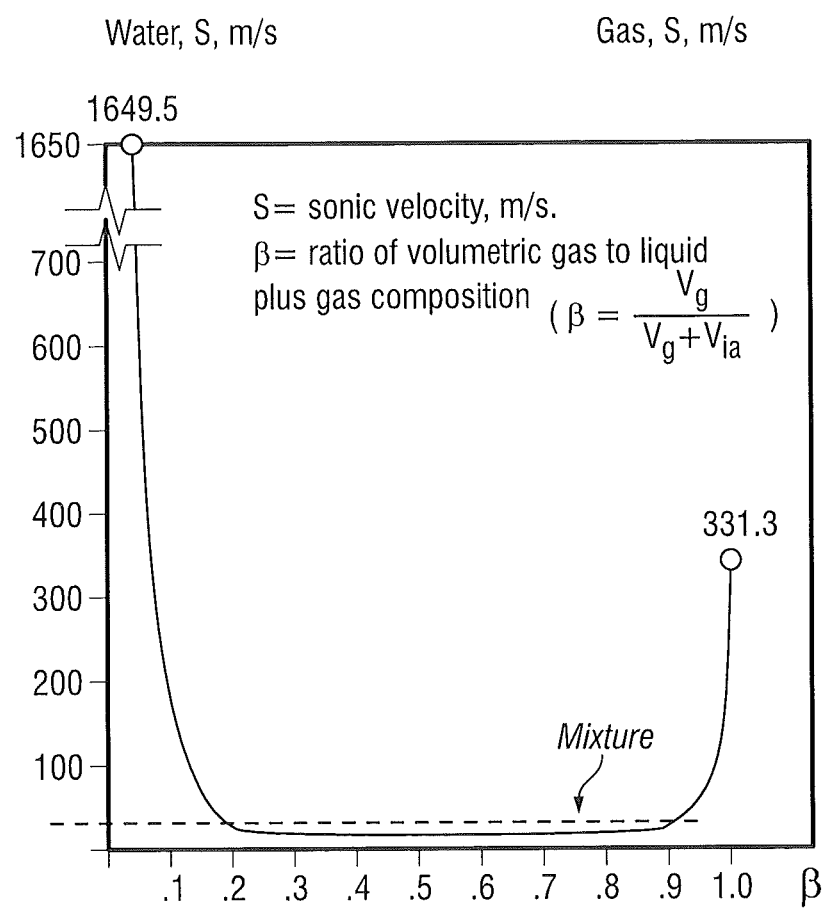
FIG. 1 is a graph illustrating the relationship between the sonic velocity and the ratio of volumetric gas to liquid.

The detailed description explains embodiments of the invention, together with advantages and features, by way of example with reference to the drawings.

DETAILED DESCRIPTION OF THE INVENTION

Embodiments of the present invention provide for a hypersonic kinetic energy harvester, heat exchanger, mixer, dozator, homogenizer, pasteurizer, desuperheater, pump, flow/energy meter, emulsifier, thruster, expander and hyper condensate recycler (collectively herein referred to as a kinetic energy harvester, or KEH). Embodiments of the present invention create conditions for kinetic and thermal energy harvesting and substantial reduction of the thermal and pumping energy consumption by utilizing the KEH as herein described below. Embodiments of the invention provide for a KEH that converts the kinetic energy of the working fluid, supplied by the variable speed pump, into thermal and pumping energy, and provide reliable, stable and cavitation free operation of the system. This provides advantages in substantially reducing the energy consumption of the existing pump and the conventional thermal energy supply. Embodiments of the invention may also be equipped with a deaerator which thoroughly removes from the liquid the non-condensable gases and substantially improves the thermal energy harvesting. The KEH may also operate without any external pump, as long as the fluids are present in the reactant mixing chamber and there is a thermal delta or a delta-pressure the KEH will start operating and will pump the fluids.

The performance of embodiments of the KEH are based on properties of two-phase flows, first of all of their increased compressibility. In order to improve the effectiveness and thermal energy harvesting rate of the KEH, the cold liquid is initially preheated in a boiler, by district energy, solar, geothermal, wind, biomass, fossil, nuclear, waste or chemical energy, and is pumped (at the startup of the device) into the KEH. In the KEH the single phase liquid flow at subsonic conditions is transformed into a homogeneous two-phase flow (plasma) which is transferred into a supersonic flow containing multiple microscopic vapor bubbles; then the simultaneous collapse of the vapor babbles in the supersonic two-phase flow takes place with resulting conversion of the two-phase flow into single phase flow, providing additional thermal energy and some pumping power. The capability and versatility of the KEH is such that depending upon end user requirements the KEH's capability can be configured to meet specific applications.

Embodiments of the KEH consist of a diffuser equipped with geometry directing ribs. The diffuser is connected to a ring equipped with multiple tubes having helical ribs on inside surface. The ribs generate a swirl flow resulting in a centrifugal action that provides effective turbulization of the liquid. Afterwards, the liquid enters an open chamber. At this chamber the original liquid stream injects an additional liquid stream recirculating in the concentric external pipe from the discharge section of the KEH. The mixed flow further discharges into the coaxial nozzle located at the entrance of the Laval nozzle. After the Laval nozzle the liquid pressure is reduced to a value not higher than the saturation vapor pressure corresponding to the liquid temperature. At these conditions multiple vapor bubbles are formed in the liquid. The length of the Laval nozzle is a predetermined length.

At a predetermined distance from the Laval nozzle the liquid enters a geometry nozzle after which a counter pressure is applied causing emergence of a pressure surge with avalanche collapsing therein of the vapor component of the two-phase flow. In the course of the pressure surge, a range of oscillations is generated fostering collapsing of newly formed small vapor bubbles, which in their turn generate thermal energy and increase in the temperature of the liquid and a thrust of the liquid. At this point, part of the liquid is separated from the main stream and re-circulated back to the mixing chamber at the entrance of the KEH. The main liquid stream moves a predetermined distance and afterwards enters into a geometry ring/screen where additional thermal energy is harvested. Afterwards the liquid enters the conical discharge section from which the liquid with increased temperature is discharged in the piping system. The recirculation of a partial stream inside of the KEH allows providing reliable stable operational modes of the system in a wide range of system parameters (flow rates, temperatures and pressures).

The heated liquid is transported to the heat users. From the users the cooled liquid stream may recirculate back to the boiler or other heat input source. The return liquid can also pass through a deaerator in which the liquid is deeply deaerated. The removal of the non-condensable gases in the deaerator improves the energy harvesting process. In the repeated recirculation cycles the major heat input and pumping power are provided by the KEH and the heat input of the boiler and the pumping power of the pump are substantially reduced. When the liquid is not returned from the customer, make-up liquid is provided to the KEH.

The dependence of the jump pressure, $P_2$, from the pressure before the jump inside of the device (Pbj) is described by the following equation:

$$P_2 = kP_{bj}M^2 \qquad (3)$$

In the transonic or over sonic flow the homogeneous two-phase stream is achieved by the reduction of the sonic velocity which permits to achieve the Max Number equal or higher than one (M≥1) at low stream velocities.

The work balance of the KEH is described by the following equation:

$$\frac{k}{k-1}P_w V_w \left[\left(\frac{P_w}{P_i}\right)^{\frac{k-1}{k}} - 1\right] = (P_d - P_i)V_n(u+1) \qquad (4)$$

Where:
k=Cp/Cv;
$C_p$=specific heat at constant pressure; $C_v$=specific heat at constant volume; w, i, d—Subscript denoting the following parameters of the working, injected and discharge streams: P=pressure and V=specific volume; u=injection coefficient equal to the ratio of injected and working flow rates.

The specific characteristics of the KEH are closely related to the geometry of the mixing chamber. The discharge pressure (Pd) after the KEH is presented by the following equation:

$$P_d = \qquad (5)$$
$$P_w\left[T_{w1}\frac{f_{w1}}{f_3} + \frac{K_1}{\varphi_1}k_w T_{wc}\lambda_{w1}\frac{f_{wc}}{f_3} - (1-0.5\varphi_1^2)k_w\left(\frac{2}{k_w+1}\right)^{k_w+1/k_w-1}\frac{V_d}{V_w}\right.$$
$$\left.\left(\frac{f_{wc}}{f_3}\right)^2(1+u)^2\right] + \left(1 - \frac{f_{wc}}{f_3}\right)P_i$$

Where: $T_{w1}=P_i/P_w$; $f_{w1}$=cross section of the working nozzle exhaust; $f_3$=cross section of the mixing chamber exhaust; $K_1$=working stream velocity coefficient; $\varphi_3$=diffuser stream velocity coefficient; $T_{wc}=P_c/P_w$=ratio of pressure in the critical section of the working nozzle to the working pressure; λw1=ratio of the velocity of working stream at adiabatic flow to the critical velocity; $f_{wc}$=cross section of critical section of the working nozzle; u=injection coefficient.

The relationship between the pressure at the entrance in the mixing chamber ($P_2$) and the injection coefficient is determined from the following equation:

$$\frac{P_2}{P_w} = \frac{P_i}{P_w} - \frac{k_w}{2}\left(\frac{2}{k_w+1}\right)^{k_w+1/k_w-1}\left(\frac{f_{p^*}}{f_2}\right)^2 \frac{v_i}{v_w}(1+u)^2 \qquad (6)$$

The equation of energy conservation for the medium with any compressibility is:

$$dq=(K/k-1)Pdu+1/(k-1)*u*dP+dq_{mp} \qquad (7)$$

For an incompressible fluid (k→∞, dv=0), that moves in the adiabatic channel, the only heat source is friction. An incompressible fluid cannot serve as working medium for the conversion of thermal energy into the mechanical work. The situation is different when the equation (7) is applied to the cross section of the flow at the border of the pressure jump, where on one side the highly compressible two-phase mixture of fog-like structure is located, and on other side of the section of the pressure jump a single-phase liquid with the small bubbles of steam (gas) is located.

The conditions of the heat balance in the pressure jump mode are:

$$\rho_{ld}(1-\beta)*\Delta q = \rho_g * \beta * r \qquad (8)$$

$$\Delta q = (\rho_g/\rho_{lg})*r*(M^2-1) \qquad (9)$$

Where: r=the latent heat of phase change. From the analysis of equation (9) the several conclusions may be made. First, At M<1, Δq<0—is the well-known process of evaporative cooling of liquid. Second, At M=1, Δq=0—is the phenomenon of degeneration of turbulences described, respectively, in Reference-3, Vulis, L. A., Thermodynamics Of Gas Flows, Gosenergoizdat M, L. 1950, for the internal problem of a gas moving with the near-critical speed close to the exit section of cylindrical channel, and in Reference-4, Fisenko, V. V. and Sychikov, V. I., On The Compressibility Effect On The Hydrodynamics Of Two-Phase Flows, Journal of Physical Engineering, 1977. V. 32, No. 6, for the exterior problem of the flow around cylinder of the near sonic flow of gas. For the uniform two-phase mixture the problem was addressed in Reference-5, Gukhman, A. A., Gandelsman, A. F. and Naurits, L. N., On The Hydraulic Resistance In The Supersonic Zone Of Flow, Energomashinostroenie, 1957, No. 7. Finally, At M>1, Δq>0—is the phenomenon, which was addressed in Reference-6, Potapov, U.S., Fominskii, L. P. and Potapov, S. U. Vortex Energy, www.transgasindustry.ru/books, by U. Potapov under a certain internal geometric influence on the fluid flow.

Under the controlled geometric, thermal, expense or combined influence on the fluid flow the maximum possible release of thermal energy by the internal energy of liquid is described by the following equation:

$$\Delta q = (\Delta P/\rho_{ld})*M^2/k-1) \qquad (10)$$

Where: ΔP=differential between the pressure in the jump and the back pressure of system where the generated energy is supplied; and, $\rho_{ld}$=the density of liquid at the exit from the KEH.

Experiments have demonstrated that by changing the internal geometry of the KEH, temperature, pressure, chemical composition, adding sound waves, electric stimulation, configuration of piping, combination of gases and liquids and gravity forces, can change and enhance the device parameters and increase substantially the harvested thermal energy and pumping power.

Figure 2:
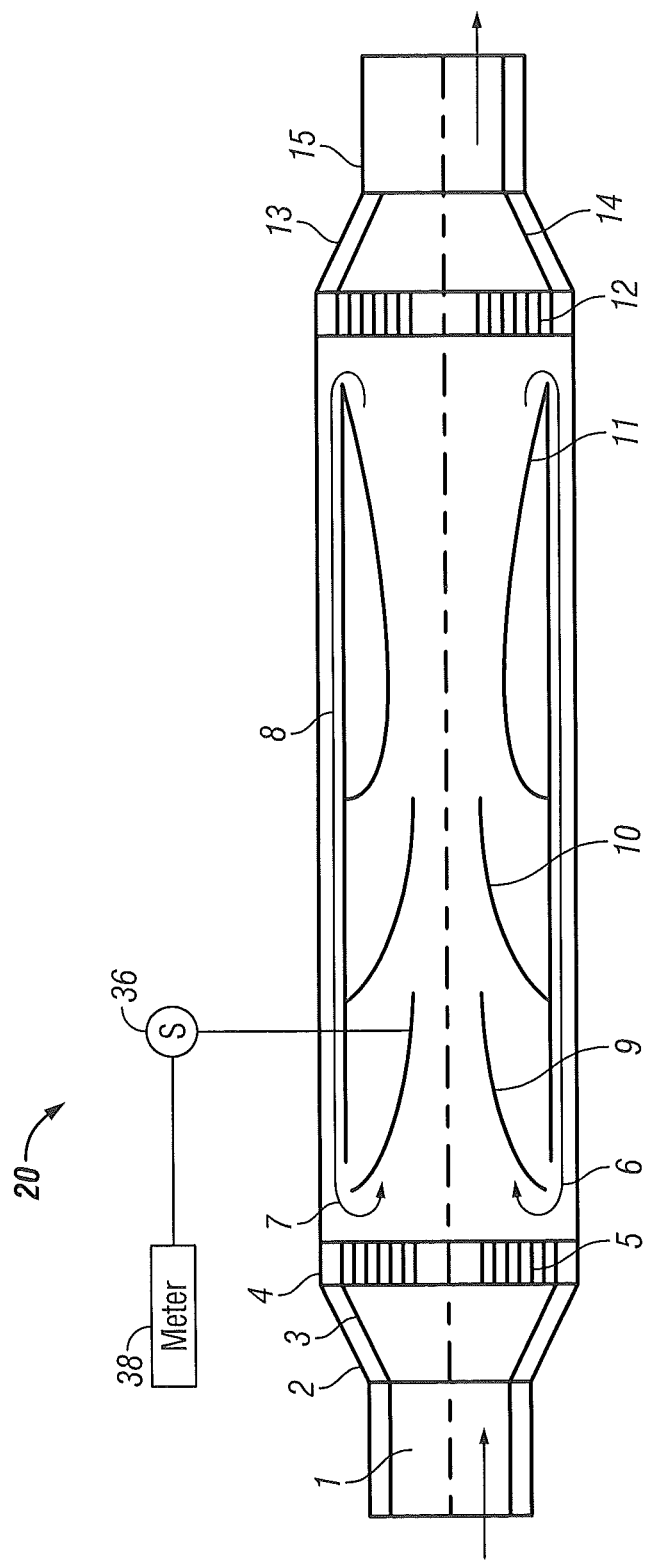
FIG. 2 is a schematic illustration of a Fisonic-type device in accordance with an embodiment of the invention.
Figure 3:
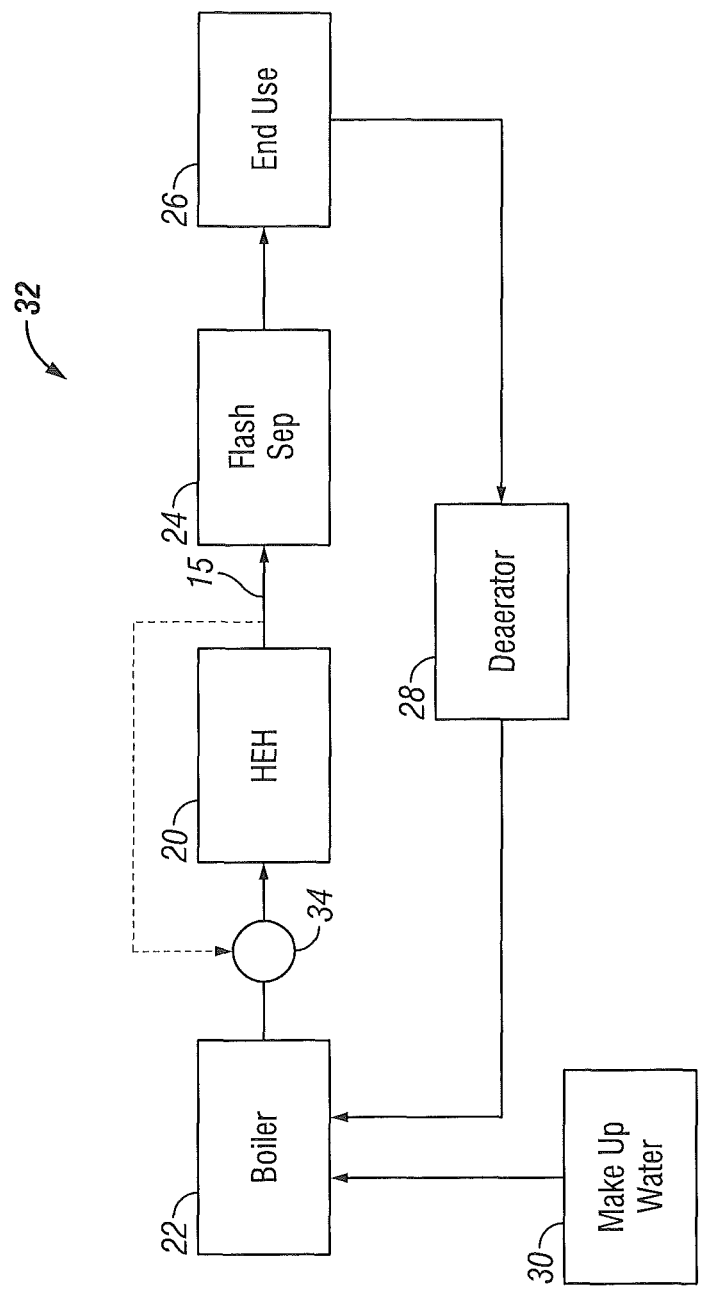
FIG. 3 is a schematic illustration of a system incorporating the device of FIG. 2.

One embodiment of the KEH 20 is illustrated in FIG. 2 and FIG. 3. A liquid 1 is pumped and initially preheated in a device 22, such as but not limited to a boiler, by district energy, solar, geothermal, wind, biomass, fossil, waste or chemical energy for example. It should be appreciated that while the embodiment described herein references a linear construction of the KEH, the claimed invention should not be so limited. In some embodiments, the KEH is configured in the shape of a 360 degree ring torus for example. After heating, the liquid 1 is pumped (during start up) into the KEH 20. The KEH 20 includes of a diffuser 2 equipped with geometry directing ribs 3.

The diffuser is connected to a ring 4 equipped with multiple tubes 5 having helical ribs on an inside surface. The ribs being configured to generate a swirl flow resulting in a centrifugal action to provides turbulization of the liquid. Afterwards the liquid enters in an open chamber 6. The length of the mixing chamber may be changed depending on the end use application. In chamber 6, a portion of the original liquid stream 1 is injected as an additional liquid stream 7. The liquid stream 7 is re-circulated in the concentric external pipe 8 from the exit of nozzle 11 of the KEH 20.

The mixed flow is further discharging into a first Laval nozzle 9 that compresses the single phase liquid stream 7. In one embodiment, one or more pressure sensors 36 are coupled to the first Laval nozzle 9. The pressure sensors 36 are configured to provide a signal indicative of the pressure in the first Laval nozzle 9 to liquid flow metering device 38. The liquid stream 7 is discharged into a second Laval nozzle 10. At predetermined distance from the second Laval nozzle 10, the stream enters a nozzle 11. In one embodiment, the pressure of the single phase liquid flow after the Laval nozzle is reduced to a value not higher than the saturation vapor pressure corresponding to the liquid temperature. At these conditions multiple vapor bubbles are formed in the liquid. After the nozzle 11 a partial liquid stream is separated and re-circulated to the chamber 6 throughout the concentric pipe 8. It has been found that the recirculation of a partial stream inside of the KEH 20 allows providing reliable stable operational modes of the system in a wide range of system parameters (flow rates, temperatures and pressures).

In one embodiment, the nozzle 11 provides a braking effect on the two-phase flow and create counter pressure which causes emergence of a pressure surge with avalanche collapsing therein of the vapor component of the two-phase flow and conversion of two-phase flow into single phase flow. In the course of the pressure surge, a range of oscillations is generated fostering collapsing of microscopic vapor bubbles, which in their turn harvest thermal energy and increase in the temperature of the liquid and a thrust of the liquid.

The main liquid stream moves some predetermined distance and enters into a ring/screen 12. Afterwards the main liquid stream enters the conical discharge section 13 equipped with ribs 14, from which the liquid with increased temperature and thrust is discharged in the piping system 15. In one embodiment, the piping system includes a conduit that flows a portion of the discharge flow from the KEH 20 back to a pumping device 34. In the exemplary embodiment, the pumping device 34 is a hydro turbine pump or a Fisonic jet pump.

It should be appreciated that the KEH 20 may include additional nozzles or inputs that provide for the supply of additional liquids and gases for mixing with the main liquid stream and creation of homogeneous mixtures and emulsions.

In one embodiment, the piping system 15 can be equipped with a flash separator 24 where the heated water is flashed, steam is separated and supplied to an end use application 26, such as a building steam heating system for example. The separator is connected to a KEH 20, which reduces the pressure in the separator and provides the water flashing conditions.

The heated liquid or steam is then transported to the end use application 26. Once the thermal energy is extracted from the heated liquid or steam at the end use application, the cooled liquid or condensate stream is re-circulated back to the boiler 22 or other heat input source. The return recirculation line may also be connected to a deaerator 28 where the liquid is deeply deaerated to provide removal of non-condensable gases, make-up and liquid expansion functions. In one embodiment, the deaerator is also used as an expansion device. In embodiments where cooled liquid is not returned from the end user application 26, make-up water 30 is supplied to the system 32. In the repeated recirculation cycles the heat input and pumping power provided by the KEH 20 and the heat input of the boiler substantially reduce the requirements of pumps 34 of the system 32.

In one embodiment the KEH utilizes interparticle forces (kinetic energy of one-two- and multiphase medium) and intended for mixing, temperature increase, and creation of thrust and vacuum of liquids and gases. The system can include a heat input device in the form of a boiler, district energy, solar, geothermal, wind, biomass, fossil, waste or chemical energy, a pump (for initial start up) that is connected to the KEH, which creates the conditions for energy harvesting and thrusts the heated liquid to a piping system connected to the consumer in open or closed loop circulation of the liquid medium and it may include a deaerator. The technical effect includes a KEH configured for specific range of operation. In one embodiment, the thermal energy harvesting temperature range should be between 110 C and 250 C. The KEH is applicable to various industries, transportation, irrigation, disinfection, fire extinguishing, water/oil separation, mixing, cooking, heating, cooling and low quality energy utilization.

Experiments have demonstrated that by changing the internal geometry of the KEH, temperature, pressure, chemical composition, adding sound waves, electric stimulation, configuration of piping, combination of gases and liquids and gravity forces, can change and enhance the device parameters and increase substantially the harvested kinetic and thermal energy and pumping power.

Figure 4:
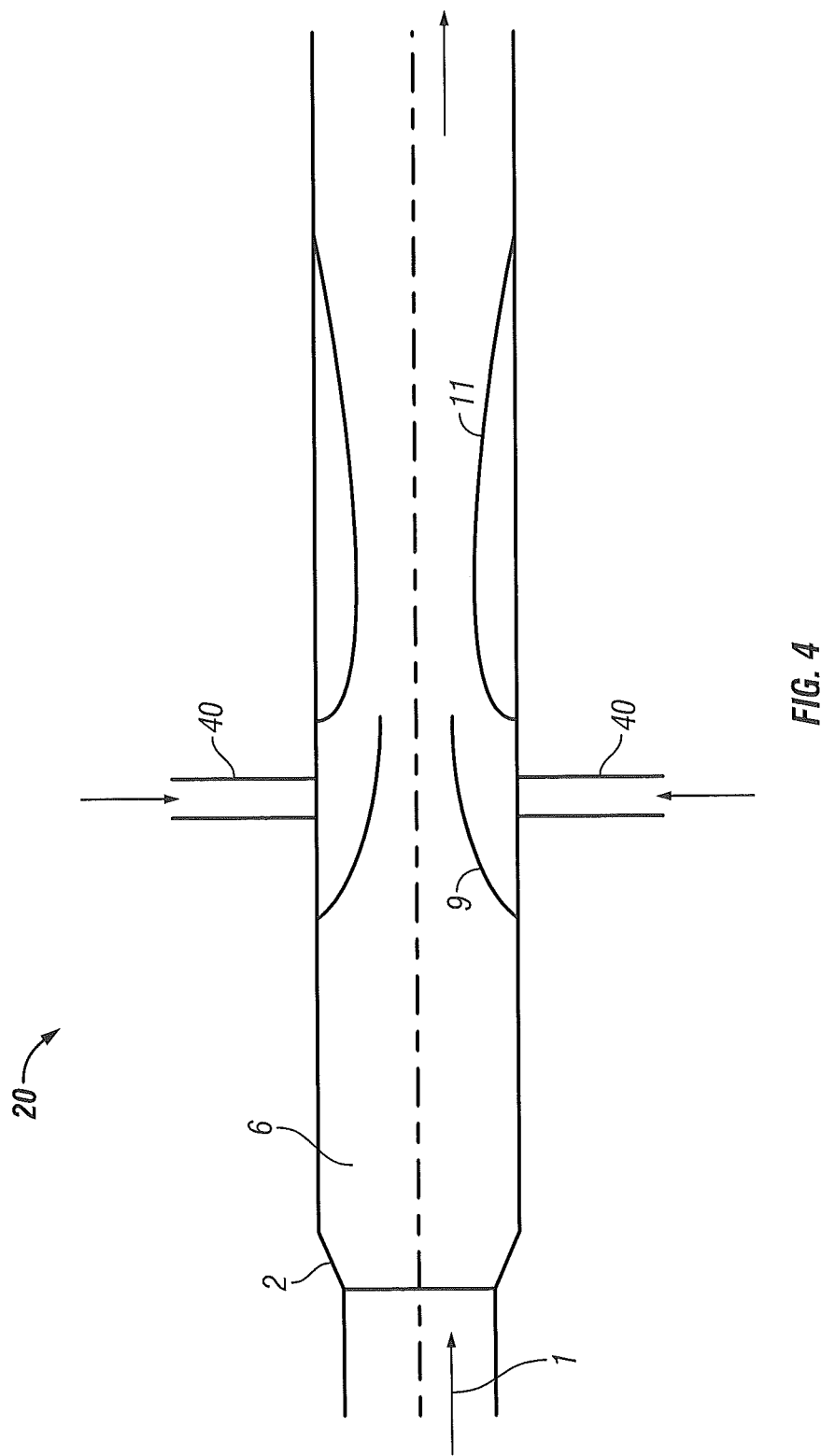
FIG. 4-FIG. 16 are schematic illustrations of other embodiments of Fisonic-type devices in accordance with other embodiments of the invention.

FIG. 4-FIG. 17 illustrate different embodiments of the KEH. The KEH 20 of FIG. 4 illustrates an embodiment wherein the KEH 20 performs as a two or multiphase thermo kinetic amplifier. In this embodiment, the KEH 20 has a single Laval nozzle 9 and braking nozzle 11. In the embodiment of FIG. 4, there is no concentric pipe to recirculate a portion of the fluid stream. Instead, a conduit 40 injects a fluid stream, such as a cold liquid heat carrier for example, between the entrance of Laval nozzle 9 and the entrance of nozzle 11.

Figure 5:
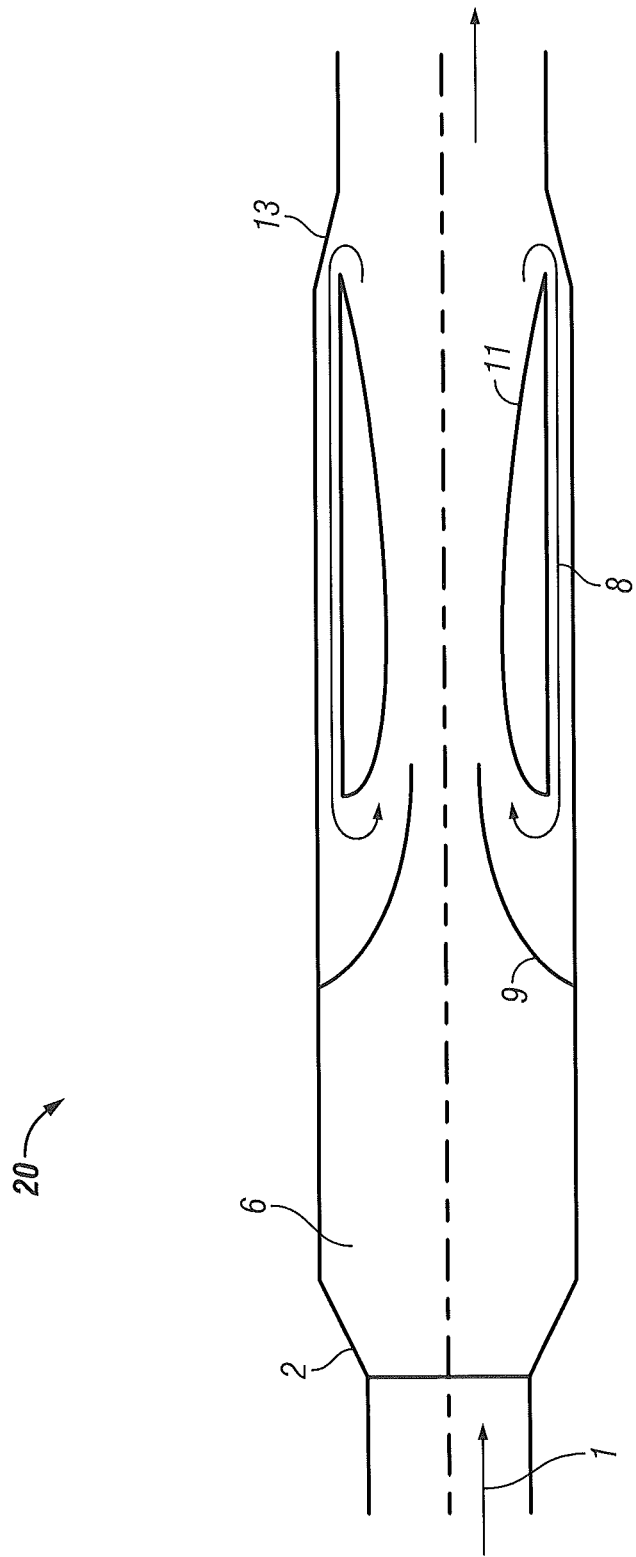

Referring now to FIG. 5, an embodiment is illustrated wherein the KEH 20 performs as a hypersonic kinetic amplifier. In this embodiment, a single Laval nozzle 9 is arranged downstream from the diffuser 2. The liquid exiting the Laval nozzle 9 is mixed with a recirculated liquid from concentric conduit 8 and enters a braking nozzle 11. Upon exiting the nozzle 11, a portion of the liquid stream recirculates via concentric conduit 11 while the remainder exits through conical discharge section 13.

Figure 6:
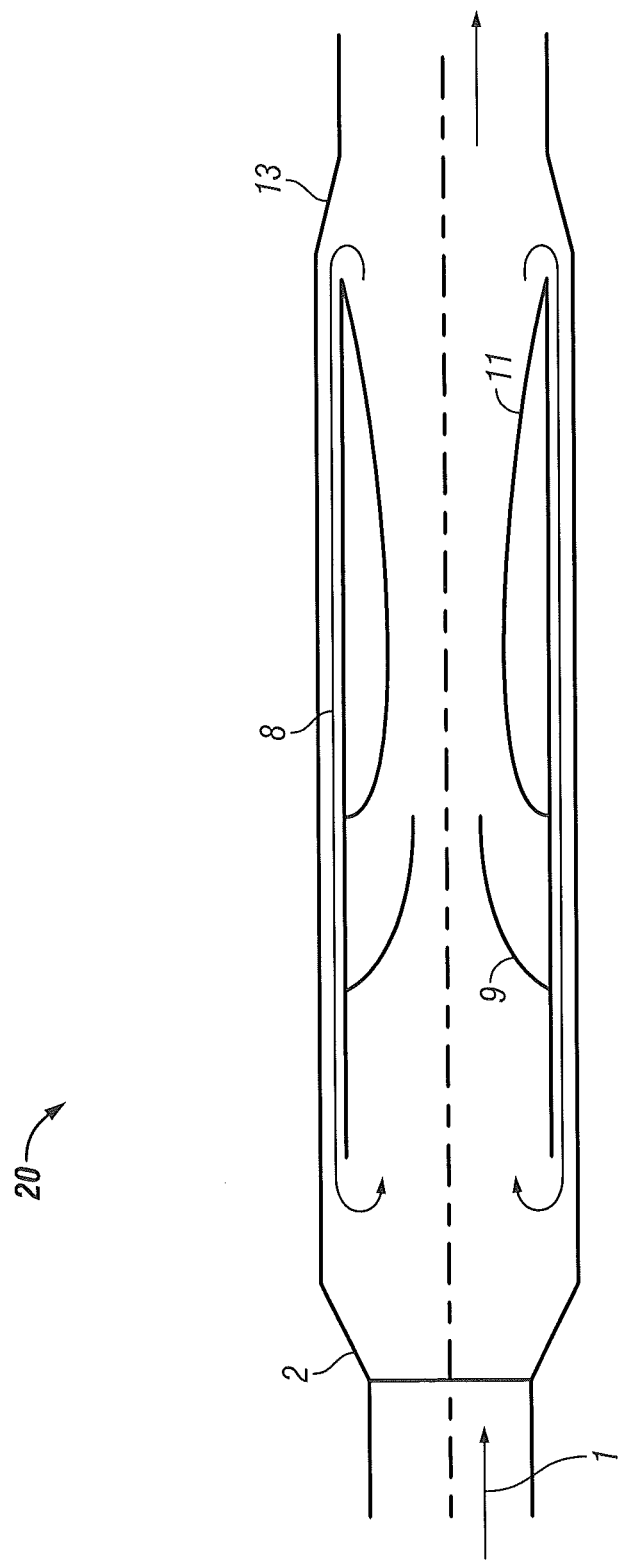

Referring now to FIG. 6, an embodiment is illustrated wherein the FD 20 performs as a multistage hyperkinetic amplifier. In this embodiment, the liquid stream 1 enters via the diffuser 2 into a chamber 6. A predetermined distance downstream from the diffuser 2, an exit of the concentric conduit 8 flows a recirculated liquid into the chamber 6 causing a mixing of the two fluid streams. The mixed stream then enters a single Laval nozzle 9 and a braking nozzle 11. The entrance to the concentric conduit 8 is arranged at the exit of the nozzle 11 causing a portion of the liquid stream to recirculate, while the remainder of the stream exits via the discharge section 13.

Figure 7:
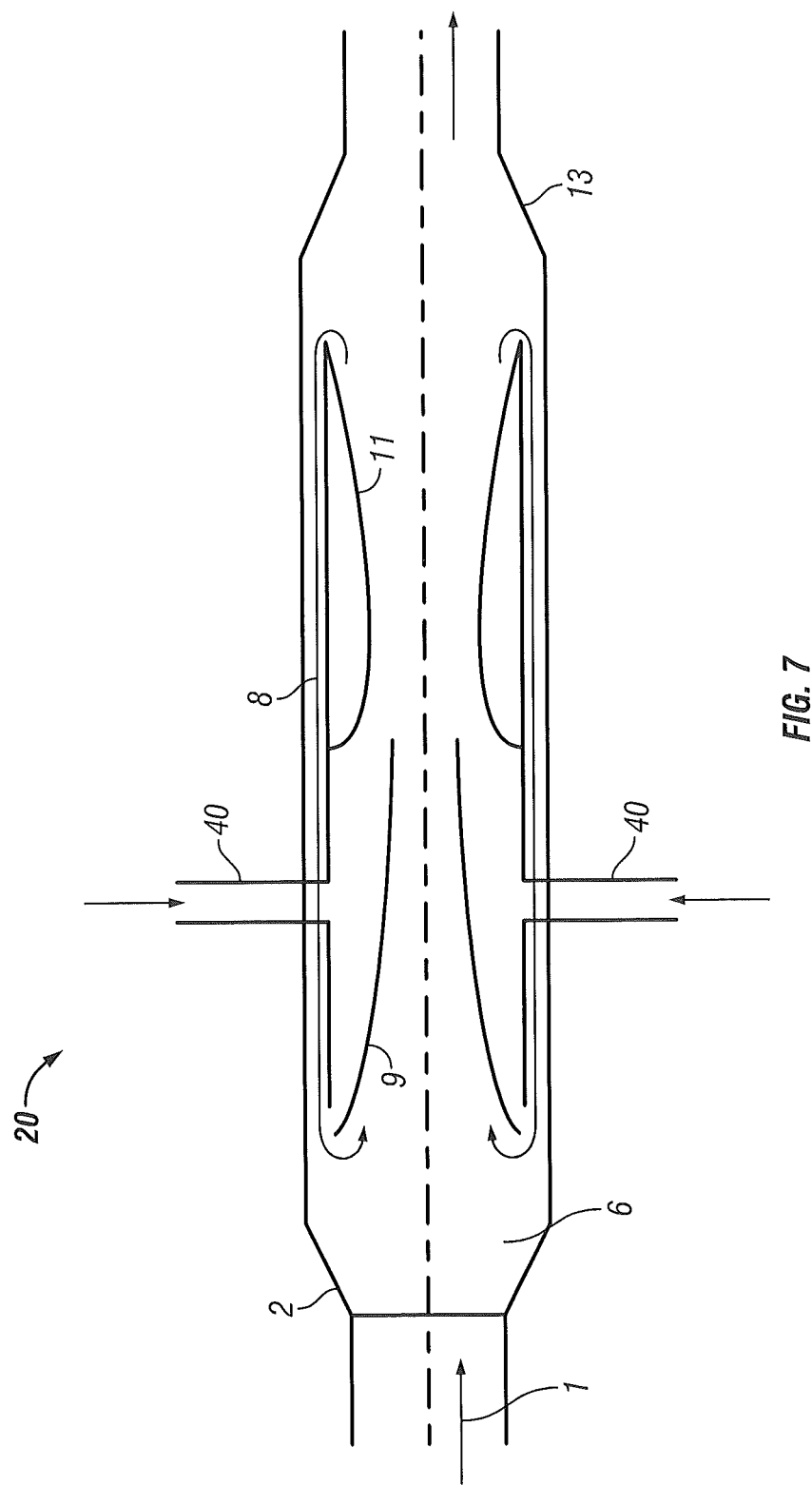

FIG. 7 illustrates a KEH 20 performing as a multiphase thermokinetic amplifier for mixing and multiflow applications. The liquid stream 1 is received by the diffuser 2 and transferred into the chamber 6 where it is mixed with recirculated liquid from concentric conduit 8. The mixed liquid flows into a Laval nozzle 9. A second liquid stream is injected via a conduit 40. The second liquid is injected between the entrance and exit of the Laval nozzle 9. This combined liquid stream enters the braking nozzle 1. The entrance to the concentric conduit 8 is arranged at the exit of nozzle 1 to cause a recirculation of a portion of the fluid stream. The remainder of the mixed fluid stream exits via the discharge section 13.

Figure 8:
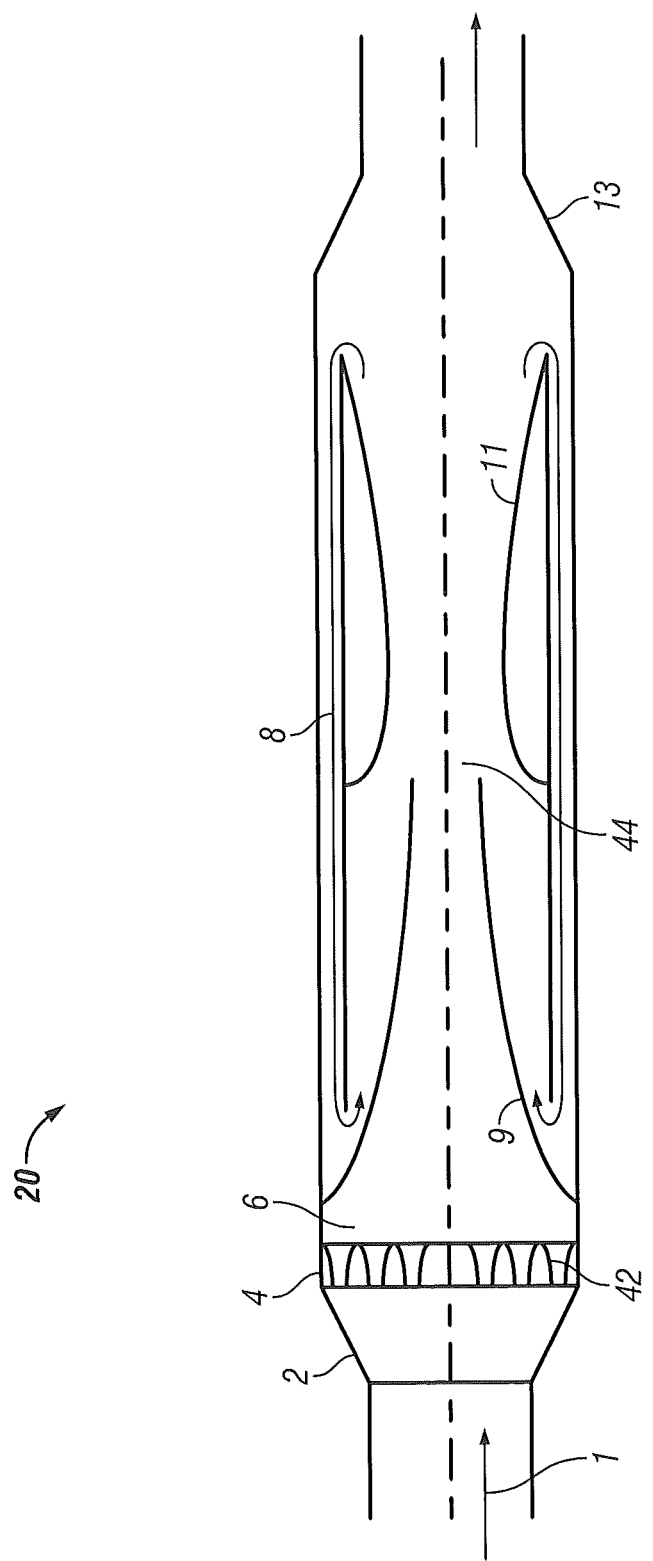

FIG. 8 illustrates a KEH 20 performing as a hyper energy thruster. In this embodiment, the liquid 1 is received in the diffuser 2 and passes through a plurality of nozzles 42 into chamber 6. The liquid passes through Laval nozzle 9 and is combined with a recirculated liquid from concentric conduit 8. The concentric conduit injects the recirculated liquid external to the Laval nozzle 9 upstream from the exit 44. The liquid from the Laval nozzle 9 and the recirculated liquid are mixed at the entrance to the braking nozzle 11. In this embodiment the exit 44 and the entrance to nozzle 11 are substantially co-located. The entrance to the concentric conduit 8 is arranged at the exit of nozzle 11 to cause a recirculation of a portion of the fluid stream. The remainder of the mixed fluid stream exits via the discharge section 13.

Figure 9:
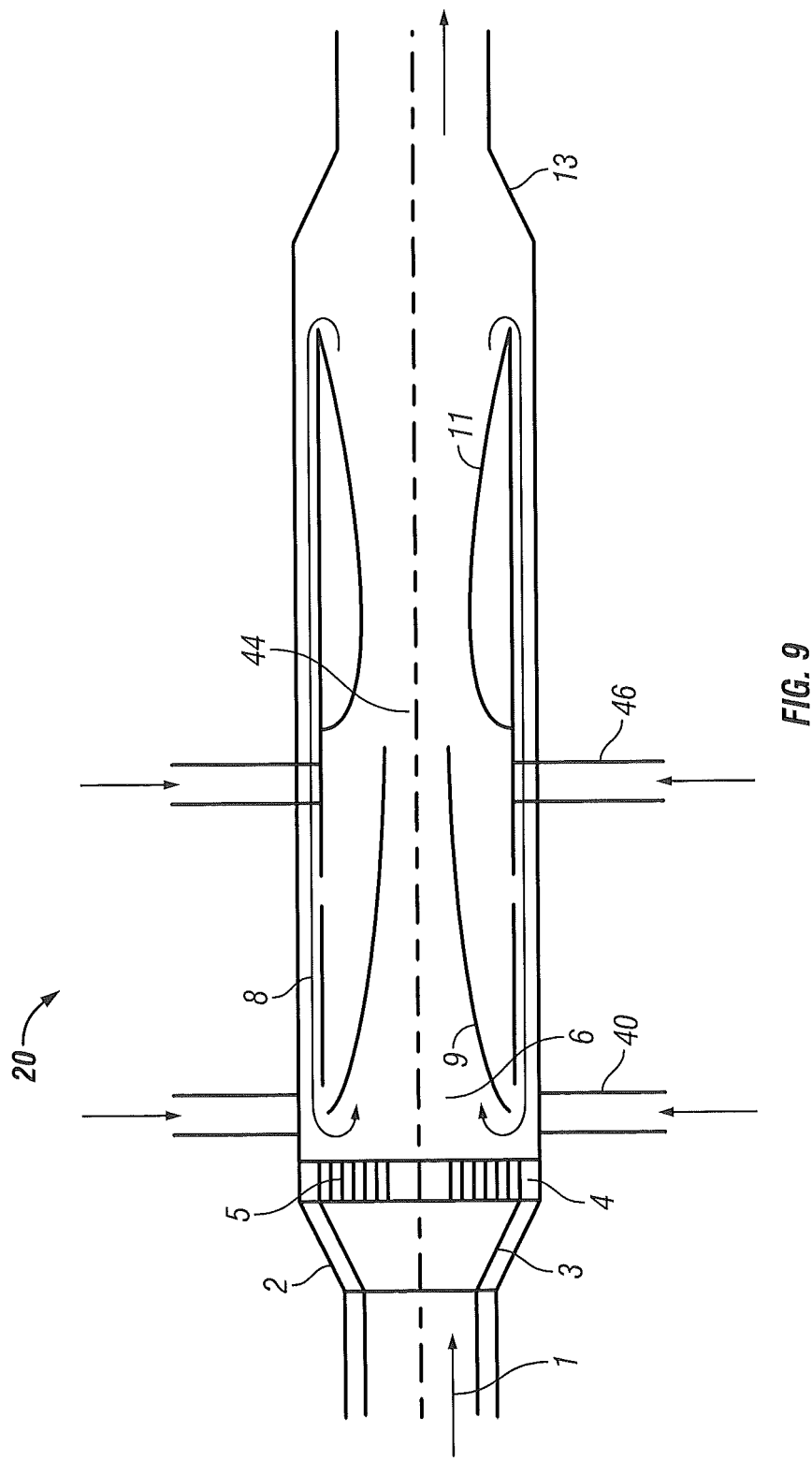

FIG. 9 illustrates a KEH 20 performing as a multi-input energy harvester. In this embodiment, the liquid 1 passes through the diffuser 2 and is directed by ribs 3 into a ring 4 having multiple tubes 5. The liquid passes through the tubes 5 into chamber 6. A conduit 40 injects a second liquid stream into the chamber 6 along with a recirculated liquid from concentric conduit 8. This combined liquid stream enters Laval nozzle 9. A third liquid stream is injected from a conduit 46 causing the liquid 1, the recirculated liquid, the second liquid stream and the third liquid stream to mix at the exit 44 and enter the braking nozzle 11. In this embodiment, the entrance to the nozzle 11 and the exit 44 are co-located. The entrance to the concentric conduit 8 is arranged at the exit of nozzle 11 to cause a recirculation of a portion of the fluid stream. The remainder of the mixed fluid stream exits via the discharge section 13.

Figure 10:
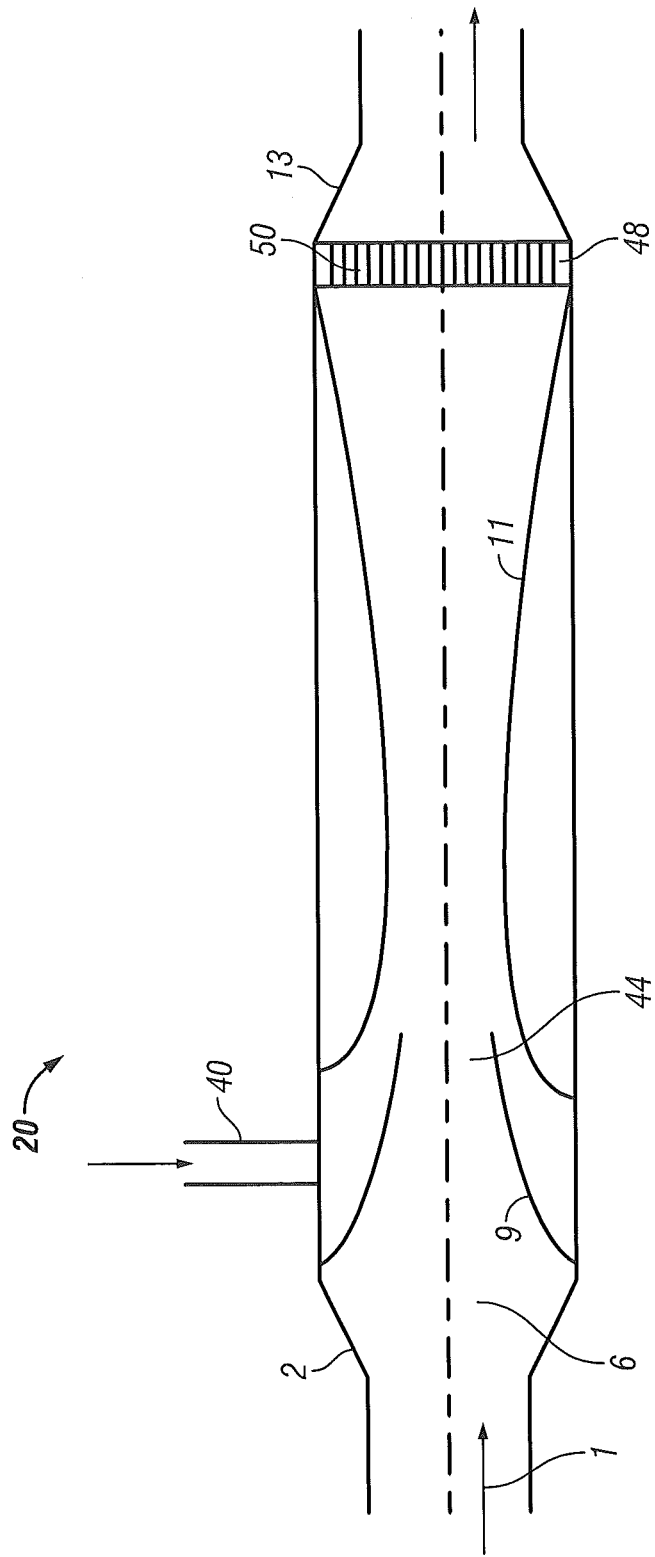

FIG. 10 illustrates a KEH 20 performing as a two-stage thermal energy harvester with an external feed. In this embodiment, the liquid 1 is received through the diffuser 2 into the chamber 6. The liquid then flows through Laval nozzle 9. An external feed conduit 40 injects a second fluid stream external to the Laval nozzle 9 upstream from the exit 44. The liquid 1 and the second fluid stream mix at the exit 44 and enter the braking nozzle 11. At the exit of the nozzle 11, a ring 48 having a plurality of tubes receives the liquid stream allowing the liquid stream to exit via the discharge section 13.

Figure 11:
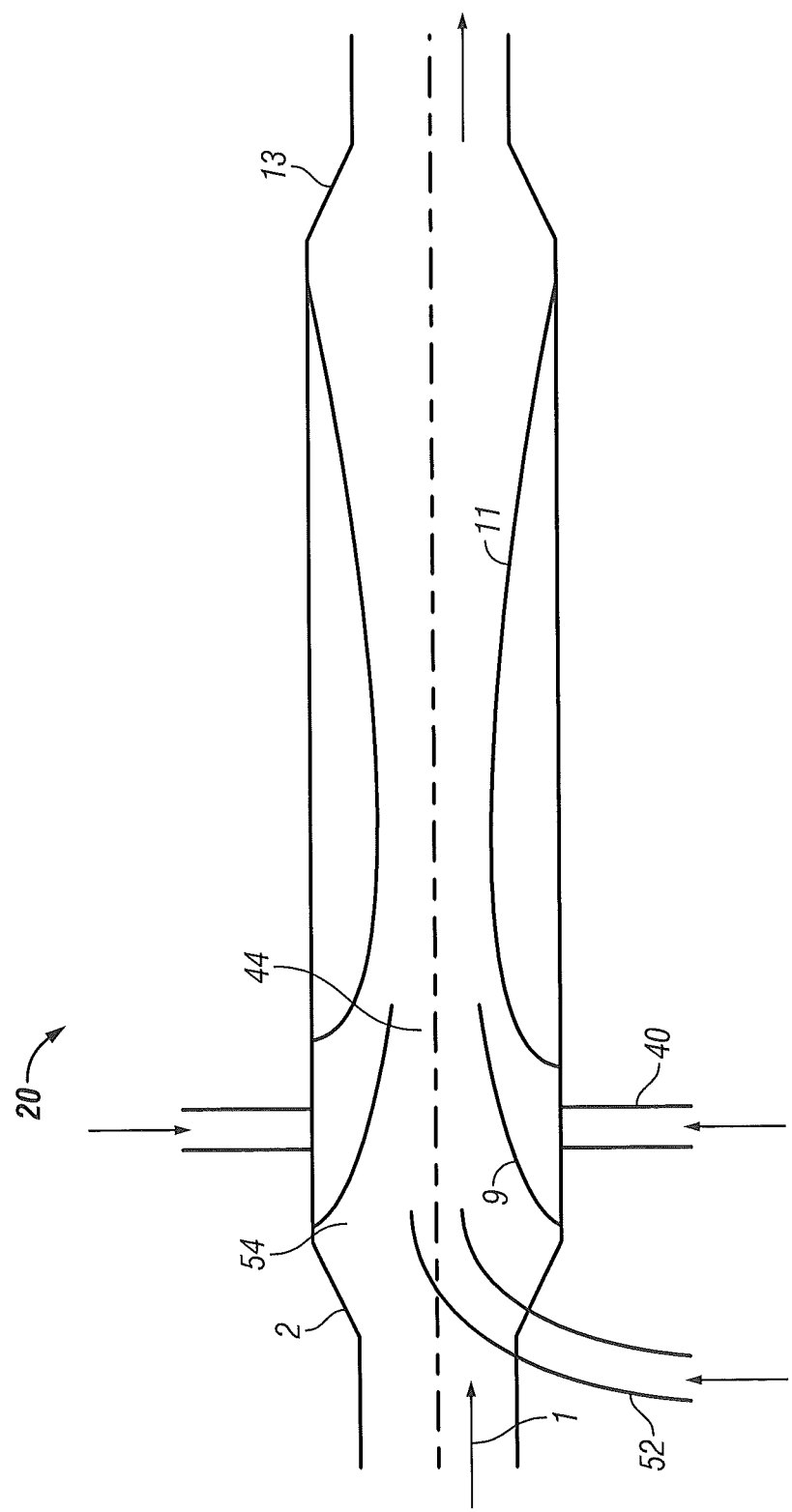

FIG. 11 illustrates an KEH 20 performing as a lower quality energy utilizer. In this embodiment, the liquid 1 is received via the diffuser 2 to the entrance 54 of a Laval nozzle 9. A second fluid stream is injected co-axially with the liquid 1 at the entrance 54. In this embodiment, the entrance 54 is substantially co-located with the exit of the diffuser 2. The combined fluid stream flows through the Laval nozzle 9 and into a braking nozzle 11. The entrance to the nozzle 11 is substantially co-located with the exit 44. The liquid stream exits the KEH 20 via the discharge section 13.

Figure 12:
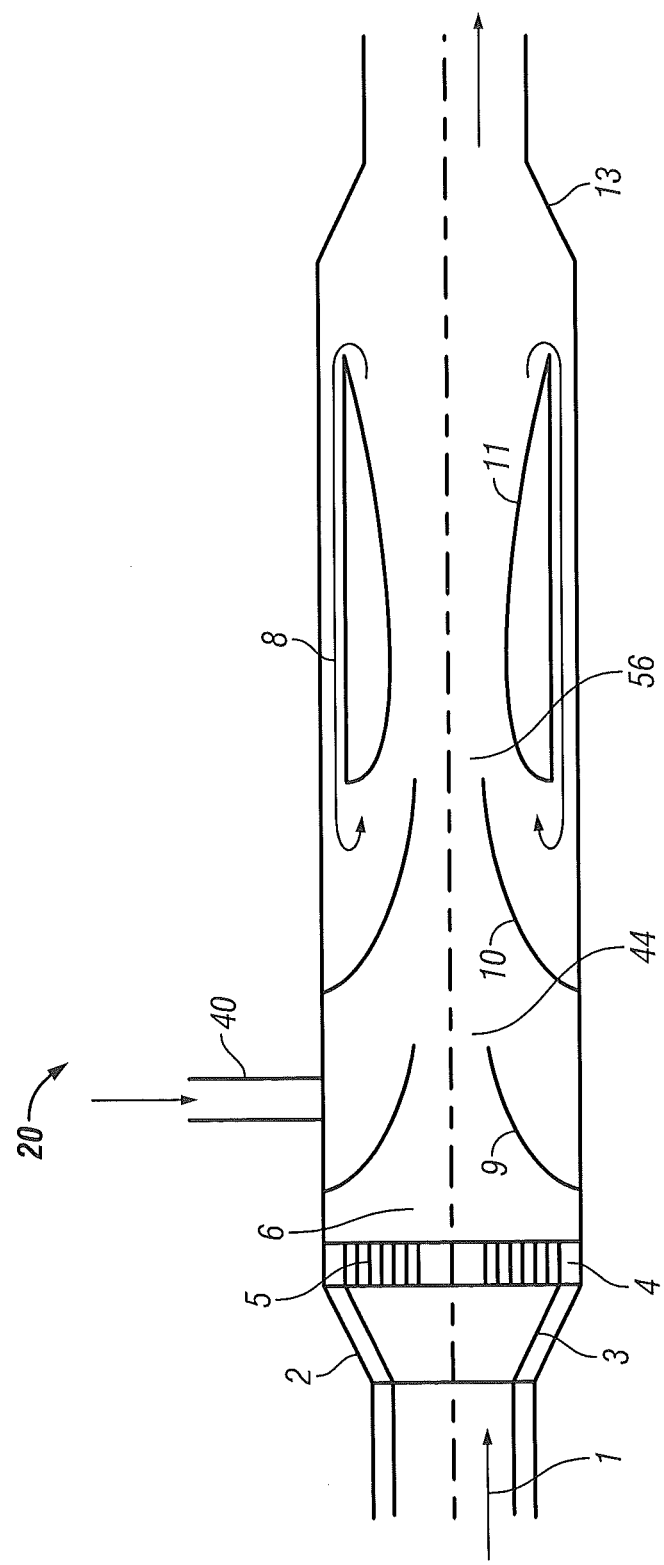

FIG. 12 illustrates a KEH 20 performing as a combined energy harvester and thruster. In this embodiment, the liquid 1 passes through the diffuser 2 and is directed by ribs 3 into a ring 4 having multiple tubes 5. The liquid passes through the tubes 5 into chamber 6. From chamber 6, the liquid flows into a first Laval nozzle 9. A second liquid stream is injected by a conduit 40 external to the first Laval nozzle 9. The liquid 1 from the first Laval nozzle 9 and the second liquid stream mix at the exit 44. A predetermined distance from the exit 44, a second Laval nozzle 10 receives the mixed liquid stream. The exit 56 of the second Laval nozzle 10 is arranged substantially co-located with an entrance to a braking nozzle 11. A concentric conduit 8 injects a recirculated liquid at the exit 56. The entrance to the concentric conduit 8 is arranged at the exit of nozzle 11 to cause a recirculation of a portion of the fluid stream. The remainder of the mixed fluid stream exits via the discharge section 13.

Figure 13:
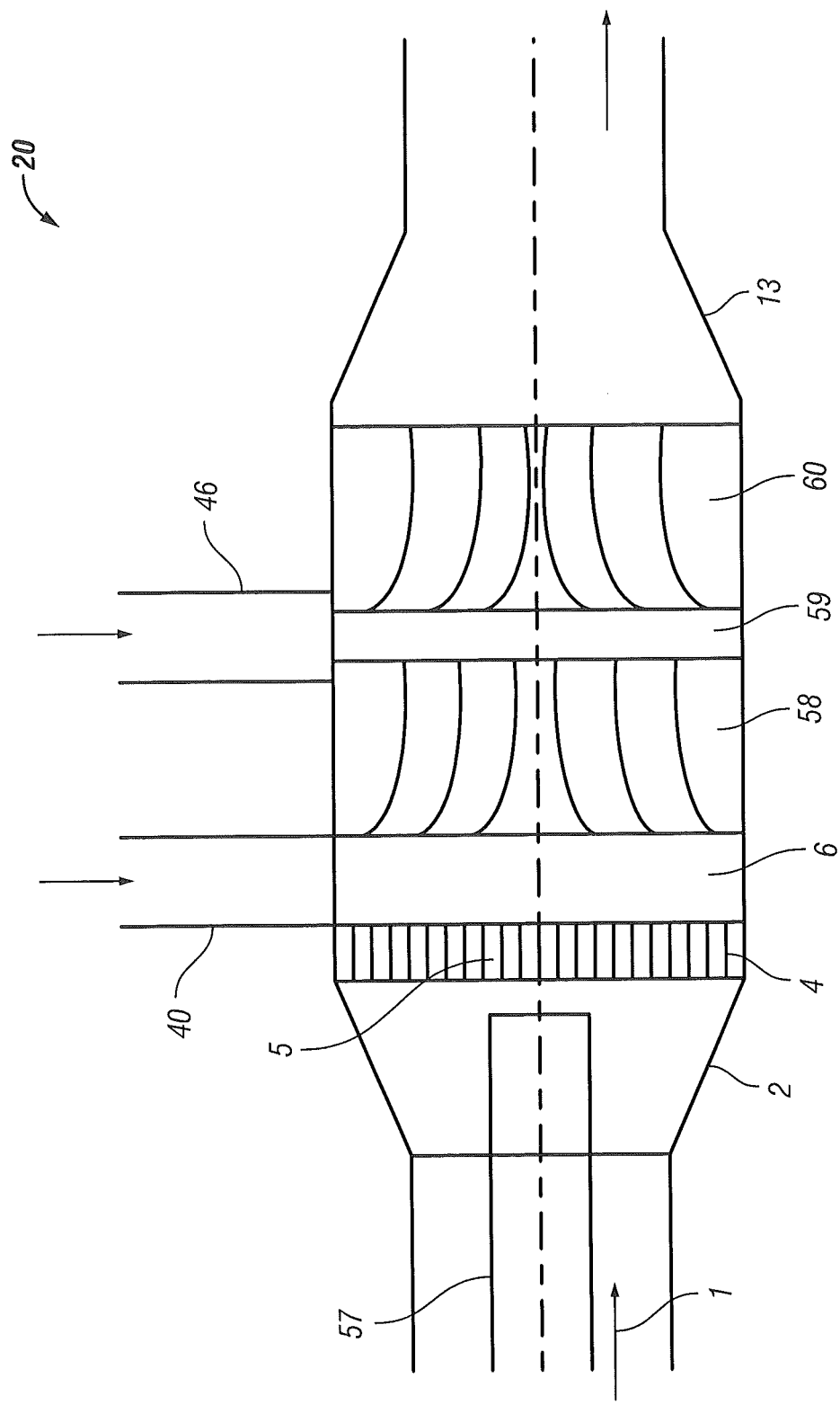

FIG. 13 illustrates the KEH 20 performing as a waste heat utilization scrubber. In this embodiment, the first liquid 1 is received via diffuser 2 and a second liquid is received from a coaxially arranged conduit 57. The two liquid streams are directed into a ring 4 having multiple tubes 5 into chamber 6. The two liquid streams are mixed with a first waste heat liquid stream from conduit 40 in chamber 6. The combined mixture is directed through a first set of vanes 58 into a second chamber 59 where the liquid stream is combined with a second waste heat liquid stream from conduit 46. This combination of fluids is directed through a second set of vanes 60 to a discharge section 13.

Figure 14:
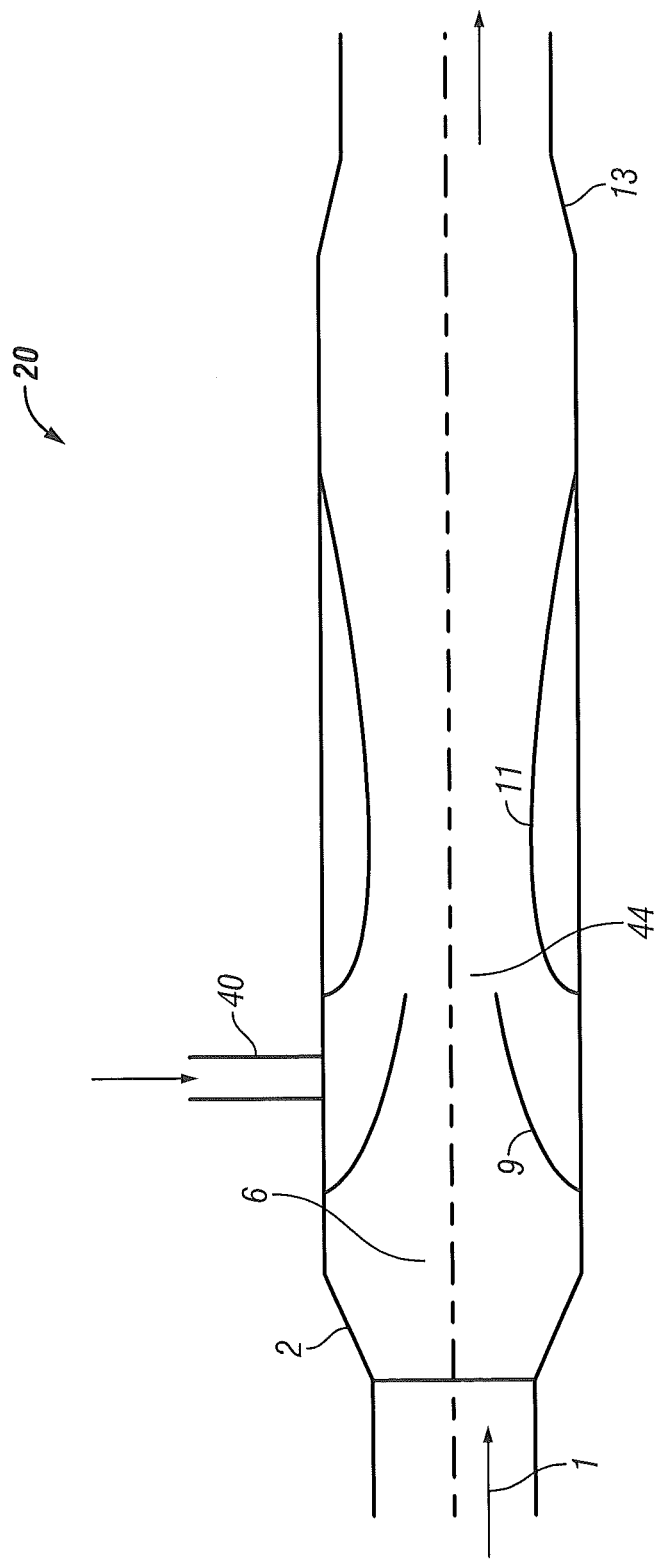

FIG. 14 illustrates the KEH 20 performing as gas/liquid mixing apparatus for such as for pasteurization and homogenization. In this embodiment, the liquid 1 is received by the diffuser 2 and passes into the chamber 6. From the chamber 6, the liquid flows into a Laval nozzle 9. A second liquid stream is injected external to the Laval nozzle 9. The liquid flowing from the Laval nozzle 9 mixes with the second liquid stream at exit 44. The combined liquids then flow into a braking nozzle 11. The entrance to the nozzle 11 is substantially co-located with the exit 44. After passing through the nozzle 11, the combined liquid exits via discharge section 13.

Figure 15:
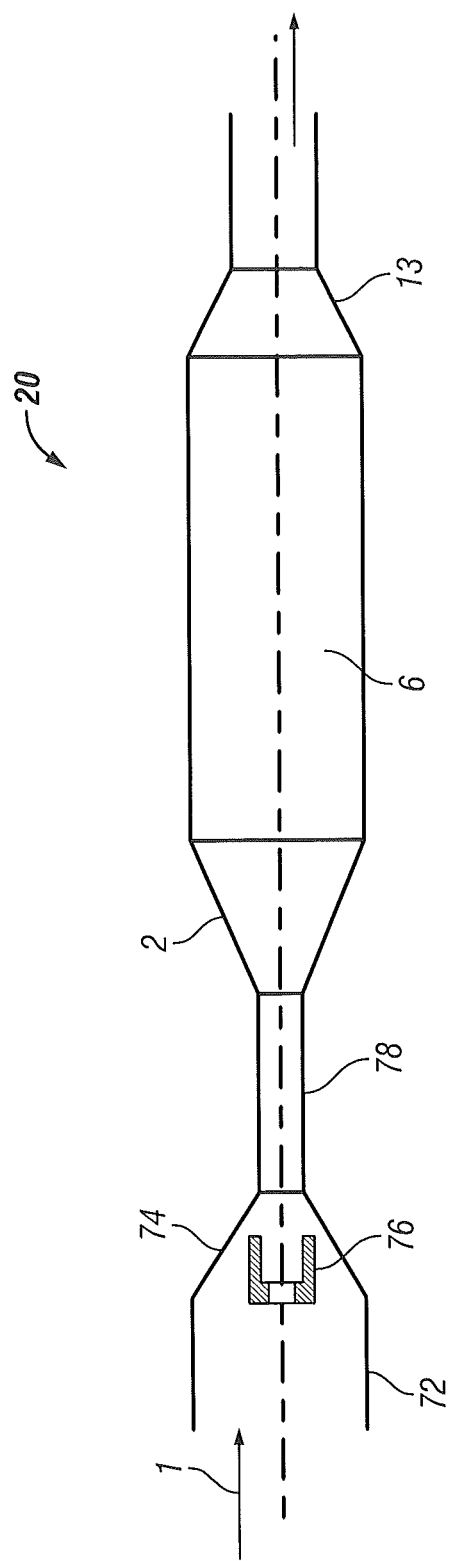

FIG. 15 illustrates the KEH 20 performing as a cavitational heat generation expander. In this embodiment, the liquid 1 enters via a first conduit 72 having a first diameter. The flow of the liquid impacts a cavitation device 76 located in a conical entry section 74. The liquid then flows into a second conduit 78 having a second diameter and a predetermined length. The diameter of the second conduit 78 is smaller than that of the first conduit 72. After passing through the second conduit 78, the liquid enters the chamber 6 via the diffuser 2. The chamber 6 has a predetermined length and terminates in discharge section 13.

Figure 16:
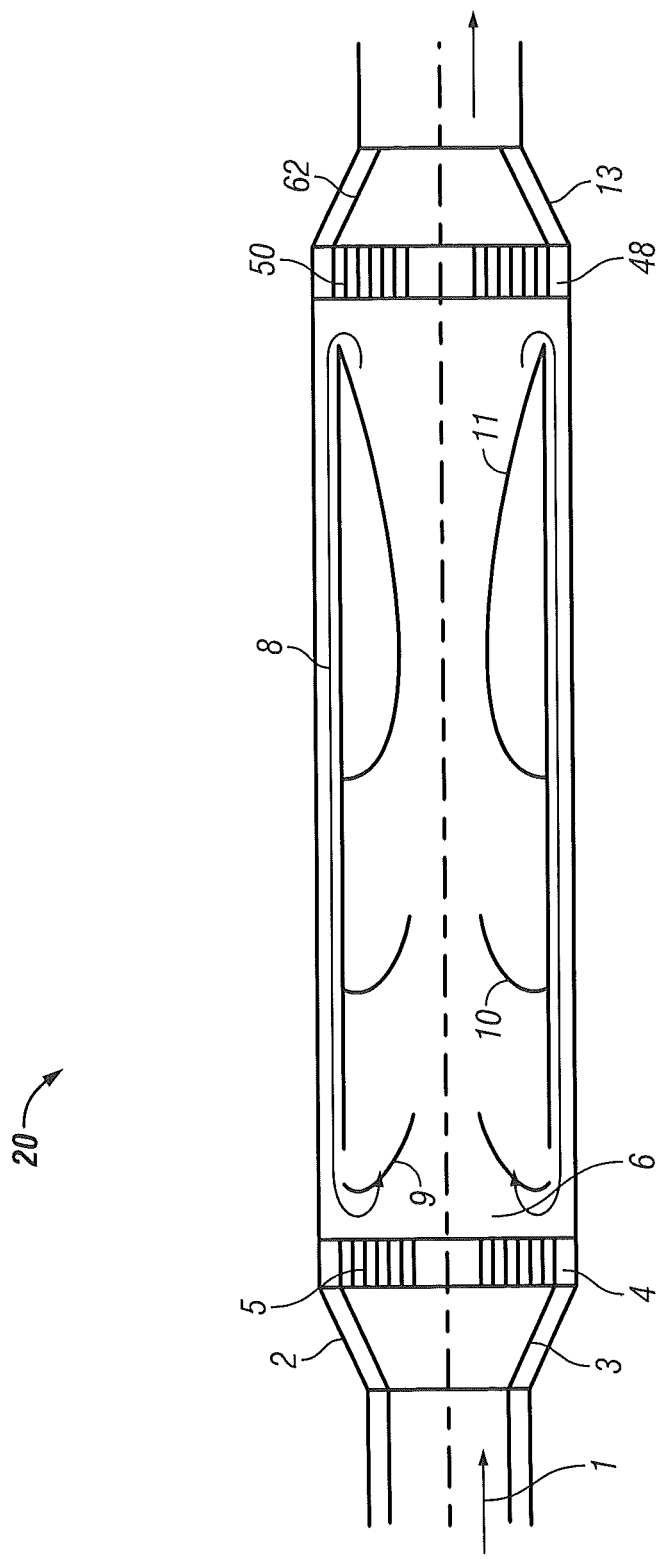

FIG. 16 illustrates the KEH 20 performing as thermal energy harvester and amplifier. In this embodiment, the liquid 1 passes through the diffuser 2 and is directed by ribs 3 into a ring 4 having multiple tubes 5. The liquid passes through the tubes 5 into chamber 6 where it is mixed with a recirculated liquid from concentric conduit 8. From chamber 6, the mixed liquid flows into a first Laval nozzle 9. The mixed liquid exits the first Laval nozzle 9 and flows a first predetermined distance before entering a second Laval nozzle 10. The mixed liquid then flows a second predetermined distance before entering a braking nozzle 11. The entrance to the concentric conduit 8 is arranged at the exit of nozzle 11 to cause a recirculation of a portion of the fluid stream. At the exit of the nozzle 11, a ring 48 having a plurality of tubes receives the liquid stream allowing the liquid stream to exit via the discharge section 13. In this embodiment, the discharge section 13 includes ribs 62 that direct the flow.

Figure 17:
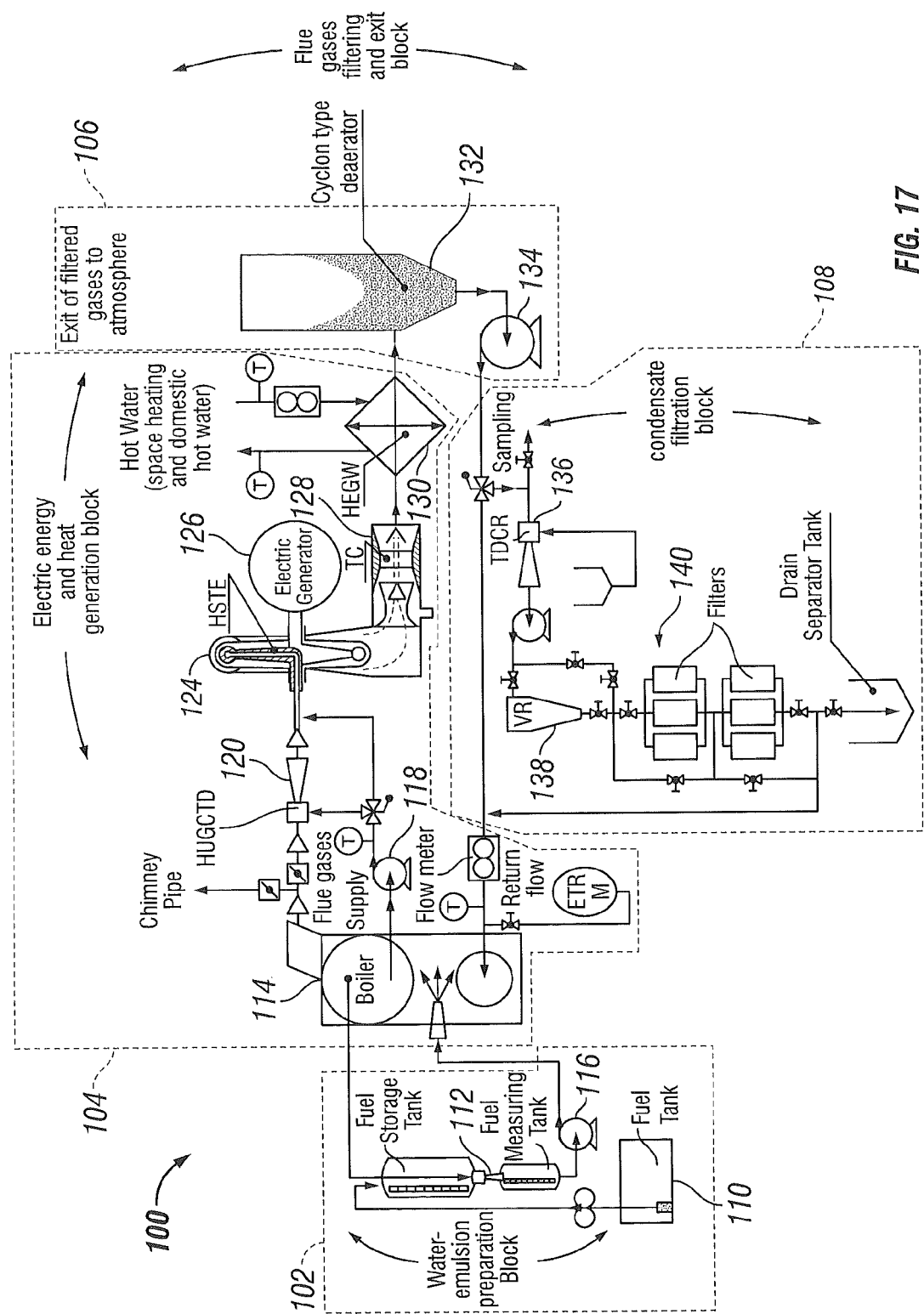
FIG. 17 is a schematic illustration of a combined heat and power system using the Fisonic-type devices of FIGS. 1-16.

Referring now to FIG. 17, an exemplary embodiment of a system 100 using one or more of the KEH 20 embodiments described herein is illustrated. The system 100 is a combined heat and power system that provides both thermal energy and electrical energy to an application such as a manufacturing or commercial office building for example. The system 100 includes a water emulsion preparation section 102, an electrical energy and heat generation section 104, a gas filter section 106 and a condensation section 108.

The water emulsion section 102 combines fuel from a fuel tank 100 is mixed with steam in a transonic emulsification device 112. The emulsified fuel is transferred to a boiler 114 by pump 116. The fuel is burned to create steam. The steam is transferred by a pump 118 into a heat utilization and gas cleaning transonic device 120. The device 120 combines high temperature flue gases from the boiler 114 to create a high pressure high temperature steam mixture at its output 122. The properties of this output 122 are suitable for use in a hydro-steam transonic turbine engine 124. The engine 124 rotates an electrical generator 126 to produce electrical power. It should be appreciated that the conditions of the steam mixture at the outlet of the engine 124 may be greater than Mach 1.

The output 128 of the engine 124 transfers the steam mixture into a transonic condenser 128. Within the condenser 128, the two-phase steam from the engine 124 is accelerated, thereafter mixing of the steam and condensate with the formation of a two-phase mixture of the condensate and steam with the transfer of the flow of the two-phase mixture to the supersonic flow conditions being realized. A change of pressure being realized in a two-phase supersonic flow with the transfer of the two-phase flow during the change of pressure by collapsing of steam bubbles and by an intensive steam condensation, into the single-phase liquid subsonic flow. The condensate is heated at the same time by an intensive steam condensation in the condensate and by the collapsing of steam bubbles during the change of pressure to form a single-phase high temperature liquid. In one embodiment, the liquid is additionally heated within the condenser 128 by the addition of a deceleration stage.

This single-phase high temperature subsonic liquid flows into a heat exchanger 130 having gas/water capacity. The heat exchanger transfers thermal energy from the single-phase liquid to a heat transfer medium, such as water. This heat transfer medium may then be used for space heating, domestic hot water or process heat for example. From the heat exchanger, the cooled single-phase liquid is transferred to a deaerator 132, such as a cyclone type deaerator for example, that separates entrained air and gases from the liquid. The separated gases are filtered and vented to atmosphere.

The liquid is removed from deaerator 132 and transferred via pump 134 to condensate section 108. In condensate section 108, the liquid flows through a transonic chemical reactor device 136 and into a vortex reactor 138. The condensed liquid may be filtered using a manifolded filter arrangement 140 before being transferred back to the boiler 114 for reuse.

Figure 18:
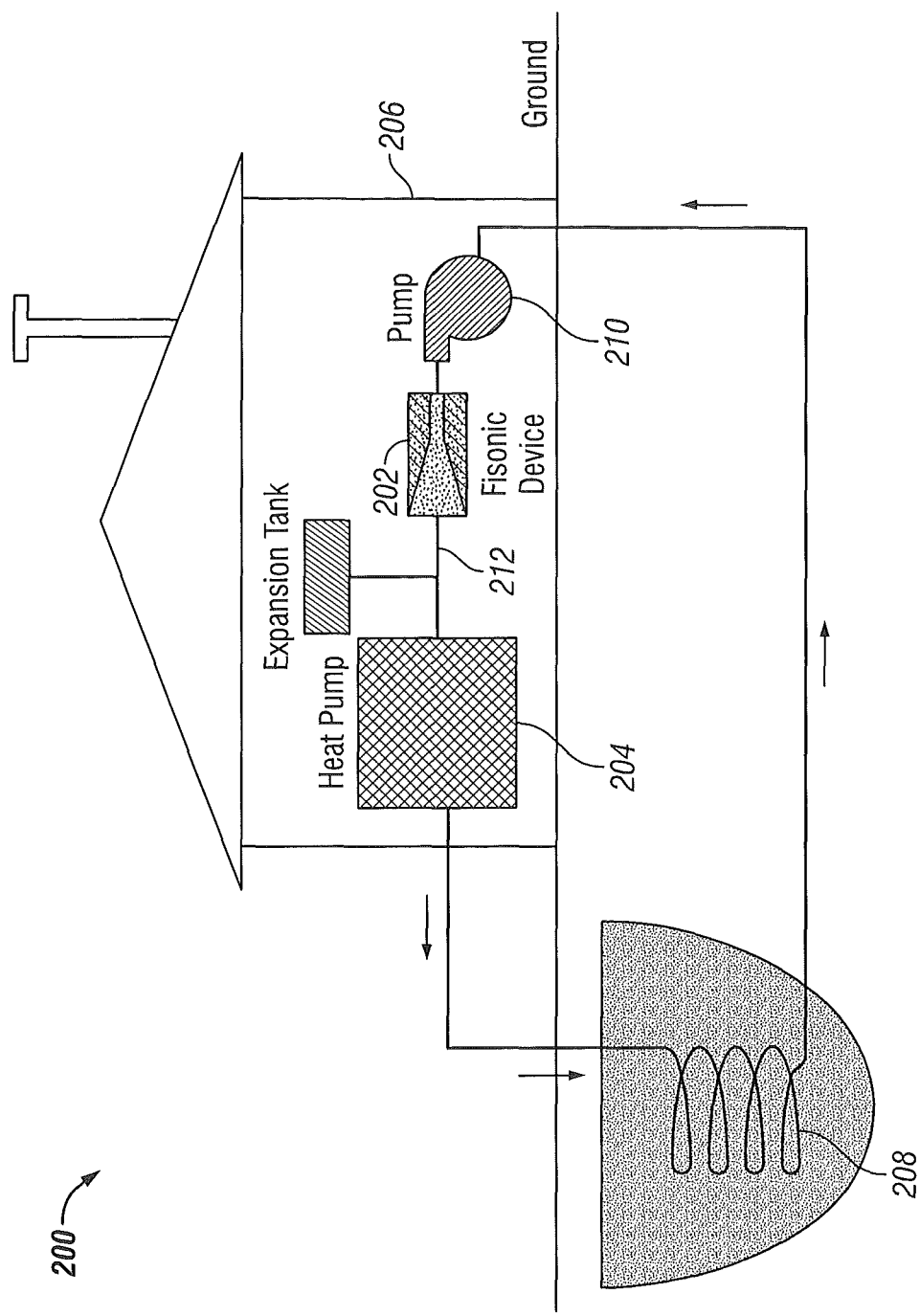
FIG. 18-20 are schematic illustrations of a heat pump system using the Fisonic-type devices of FIGS. 1-16.
Figure 19:
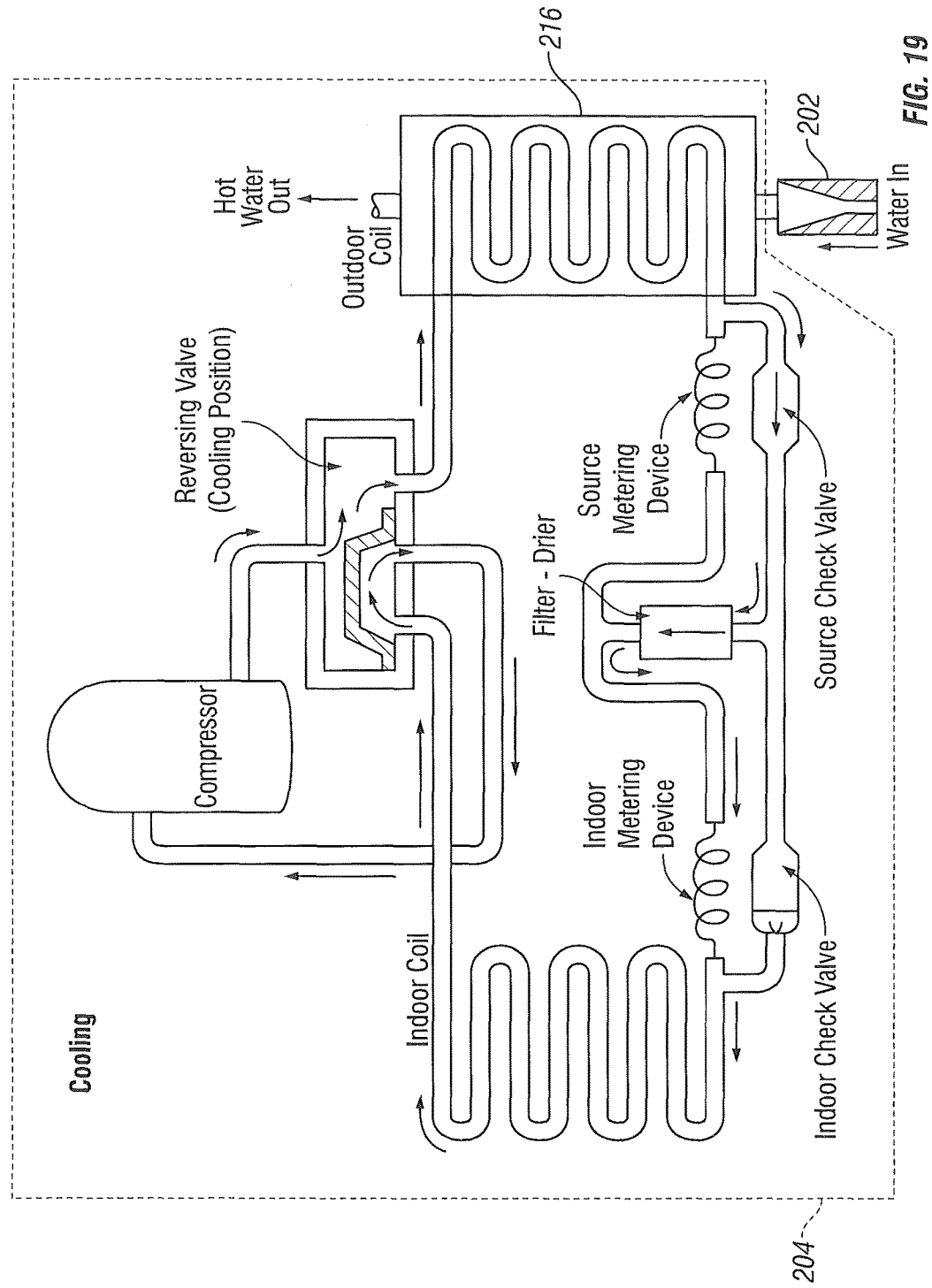
Figure 20:
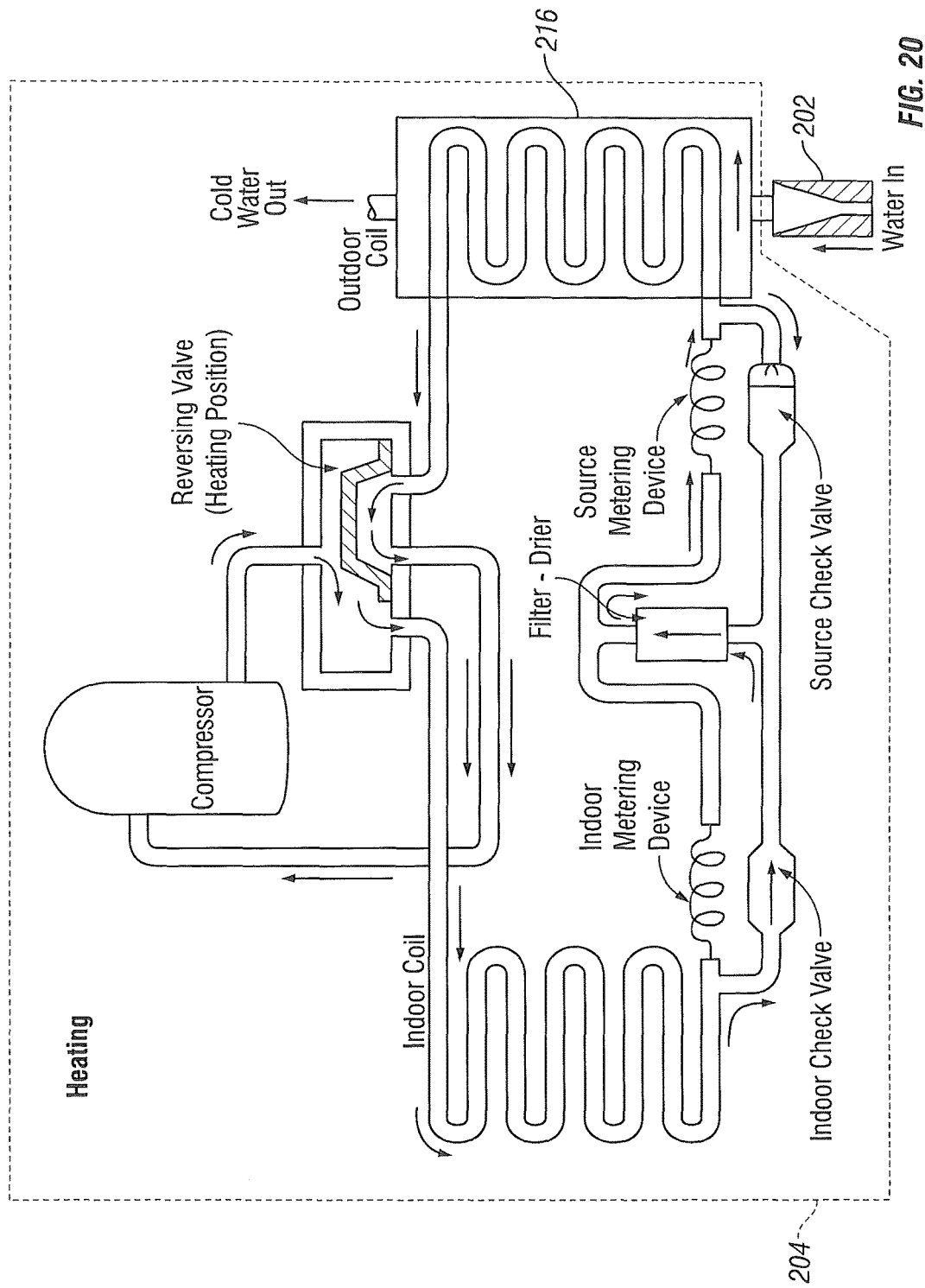

Referring now to FIGS. 18-20, an exemplary embodiment of a system 200 using a KEH 202 with a heat pump 204, such as for heating a residence 206 for example, is illustrated. In the exemplary embodiment, the system 200 is coupled to a geothermal closed-loop surface water system 208. It should be appreciated that while the embodiment herein refers to a geothermal system, the claimed invention should not be so limited. The system includes a geothermal portion 208 that receives a heat transfer medium or coolant from the heat pump 204. The coolant exits the geothermal portion 208 and is transferred via a pump 210 into KEH 202. The temperature and pressure of the coolant is increased with the KEH 202 as described herein above. The coolant exits the KEH 202 into a conduit 212. An expansion tank 214 is coupled to conduit 212. The coolant enters the heat pump 204. When in a cooling mode of operation (FIG. 19), the heat pump 204 transfers heat to the coolant via a heat exchanger 216. The coolant is then transferred to geothermal portion 208 where the thermal energy is transferred to the ground. When in heating mode of operation (FIG. 20), the coolant transfers heat to the heat pump 204 via the heat exchanger 216. The cooled coolant is then transferred to the geothermal portion 208 where coolant is heated by the ground.

According to another embodiment of the invention, a KEH is provided that is coupled to one or more heat generation devices. A first device is provided having multiple inputs, the multiple inputs includes a first input and a second input being fluidly coupled to the heat generation devices. A variable speed first pump is fluidly coupled to supply fluids from the heat generation devices to the first device. A deaerator fluidly coupled to receive the fluids from the first device. In one embodiment, the apparatus includes a second pump fluidly coupled to the first device. A second device fluidly coupled to an inlet of the second pump. A third device is fluidly coupled to an output of the second pump. The KEH improves the flow of the fluid into the pump impeller whereby electrical consumption is reduced and fluid volume is increased.

According to another embodiment of the invention, a KEH is provided that includes a diffuser fluidly coupled to the first input. The diffuser has directing ribs, wherein the pump flows the liquid into the diffuser wherein the diffuser is connected to a ring having multiple tubes with helical ribs on inside surface. The ribs generate a swirl flow resulting in a centrifugal action which provides turbulization of the liquid, wherein the first device includes an open chambers adjacent the rings. The multiple inputs are arranged to inject additional liquid recirculating streams in a concentric external pipe from a discharge portion of the first device.

According to another embodiment of the invention, a KEH is provided where the mixed flow after the open chamber is further discharged into the coaxial nozzle located at the entrance at the Laval nozzle. The single phase liquid is compressed in the Laval nozzle. The pressure of the single phase liquid flow after the Laval nozzle is reduced to a value not higher than the saturation vapor pressure corresponding to the liquid temperature to form multiple vapor bubbles are formed within the liquid. The device includes a braking nozzle adjacent the Laval nozzle. The braking nozzle being configured to create a braking effect on two-phase flow and create counter pressure which causes emergence of a pressure surge with avalanche collapsing therein of a vapor component of two-phase flow and conversion of two-phase flow into single phase flow, wherein during the pressure surge, a range of oscillations is generated fostering collapsing of microscopic vapor bubbles, which increase in the temperature of the liquid and a thrust of the liquid.

According to another embodiment of the invention, a KEH is provided where a portion of the liquid is separated downstream from the braking nozzle and recirculated back to an entrance to the chamber. A main discharge liquid stream moves a predetermined distance and afterwards enters into a ring/screen section whereby a temperature of the liquid is further increased, and wherein the main discharge liquid stream moves some predetermined distance and afterwards enters into a conical discharge section. In one embodiment, the Laval nozzle includes pressure sensors connected to an outside liquid flow metering device.

According to another embodiment of the invention, a KEH is provided where a distance between an exit of the Laval nozzle and the discharge section is of predetermined dimension. An entrance of the Laval nozzle is equipped with perforation holes. A portion of the fluids discharged from the discharge section is pumped back into a hydro turbine pump which provides flow entering the pumping device. In one embodiment, the first device further includes additional nozzles for supply of additional liquids and gases for mixing with the main liquid stream and creation of homogeneous mixtures and emulsions. In another embodiment, a flash separator is fluidly coupled to the discharge flow, and wherein the first device is configured in a shape of a 360 degree ring torus.

According to another embodiment of the invention, a method of operation of a KEH is provided. The method includes feeding at least one liquid heat carrier under pressure into a nozzle, the feeding of a cold liquid heat carrier and the mixing the liquid heat carrier and the cold liquid heat carrier. Wherein one of two conversions is carried out with the liquid flow of the liquid heat carrier mixture. A first conversion including an acceleration of the heat carrier mixture to a velocity at which the heat carrier mixture or at least one of the heat carriers of the mixture boils with the formation of a two-phase flow with the transfer of the latter to conditions with a Mach number of more than 1, and then a change of pressure with the transfer in the latter of the two-phase flow to a subsonic liquid flow of the heat carrier mixture and heating the liquid flow of the heat carrier mixture during the change of pressure being performed. A second conversion including the acceleration of the liquid flow of the heat carrier mixture to a velocity at which the heat carrier mixture or at least one of the heat carriers of the mixture boils with the formation of the two-phase flow with the transfer of the latter to the conditions with a Mach number equal to 1, then the two-phase flow being decelerated, and thereby the flow being converted into the liquid flow of the heat carrier mixture with vapor-gas bubbles, and additionally, by this flow conversion, the liquid flow of the heat carrier mixture being heated; thereafter carrying out the two above-mentioned conversions of the liquid flow of the heat carrier mixture in any sequence, the heated liquid flow of the heat carrier mixture being fed under the pressure obtained in the jet apparatus to a consumer.

According to another embodiment of the invention, the KEH may be used for emulsification, homogenization, heating, pumping and improving its rheological properties, preventing formation of space volume structures at temperatures below paraffin's crystallization point, and that of various hydrocarbons as well. This application also allows destroying the asphalt/paraffin intermolecular bonds causing anomalous viscosity. The KEH also decreases the concentration of high molecular compounds, primarily asphaltenes which are centers of supramolecular aggregates.

According to another embodiment of the invention, the KEH may be used for gas/hydrocarbon enhanced oil recovery (EOR), increase of gas/oil production, increase of liquid and gas separation and production, with simultaneous heating, breaking up the oil particles, encapsulating water with a layer of oil, and preventing concentration of water packet pools that cause rupture of oil pipe lines. The application also allows generating strong cavitation shock waves and pressures to drive the sludge oil pockets to be pumped or vacuum the oil/gas from the well. The application also allows break-up of paraffin wax and heavy crude oil formation.

According to another embodiment of the invention, the KEH may be used for enhancing cellulosic and algae based biofuel production and production of other organically based products by micro-pulverization caused by controlled internal shockwaves and shear energy generated by the KEH for more thorough and energy efficient instantaneous in-line cooking, including activation of starch fermentation at lower temperatures and requiring use of less additives.

According to another embodiment of the invention, the KEH may be used in an application that uses the excess heat in the nuclear reactor cavity to maintain the recirculation of coolant until the reactor temperatures drop to safe levels, and preventing melt-down of the reactor rods. The KEH will operate as long as there is a delta T or delta P. The KEH has no moving parts and requires no electric power. The KEH will use any supply source of water to recirculate the coolant.

According to another embodiment of the invention, a method of operation of a steam district heating system is provided whereby steam is introduced into a steam/water heat exchanger and hot water is pumped throughout user's hydronic system. An KEH replaces conventional heat exchanger and electrically driven pump, saving energy and requirement to quench condensate prior to discharge. KEH used to replace conventional steam/water heater exchanger for domestic hot water supply with a more efficient autonomic water/water hot water supply loop. KEH recovers discharge condensate from steam heated building and utilizes small quantity of steam to upgrade condensate to usable steam to be recycled throughout building heating system. KEH recovers discharge condensate or spent steam slated to be quenched with cold water and disposed as waste, is recycled to buildings for hot water systems or as grey water for multiple usages.

According to another embodiment of the invention, a method of operating heating hot tubs, swimming pools or any large contained bodies of water utilizing an KEH to heat water while destroying any microbial or bacterial elements in the water, thus eliminating requirements for large quantities of anti-bacterial additives like chlorine.

According to another embodiment of the invention, a method of simultaneously pasteurizing and homogenizing milk, dairy products and other liquid or semi-liquid consumables is provided by using a KEH in a single pass-through operation.

According to another embodiment of the invention, a method of enhancing brewery production in wort processing, system maintenance and energy savings through micro-pulverization caused by controlled internal shockwaves and shear energy generated by the KEH for more thorough mixing, energy efficient instantaneous in-line cooking, activation of starch fermentation at lower temperatures, requiring use of less additives and antibacterial action for post-operation system cleansing.

According to another embodiment of the invention, a method of enhancing industrial cleaning, wash-up, decontamination, fire control and pre-process preparation utilizing the high pressure atomization, disinfecting mixing, misting and precise dozation control capability of KEHs.

According to another embodiment of the invention, a method of increasing fuel efficiencies of engines, including diesel and turbine, by utilizing KEHs to improve mixtures, input pressures and ratios of air, fuel, water or additives for enhanced combustion and reduced emissions.

Figure 21:
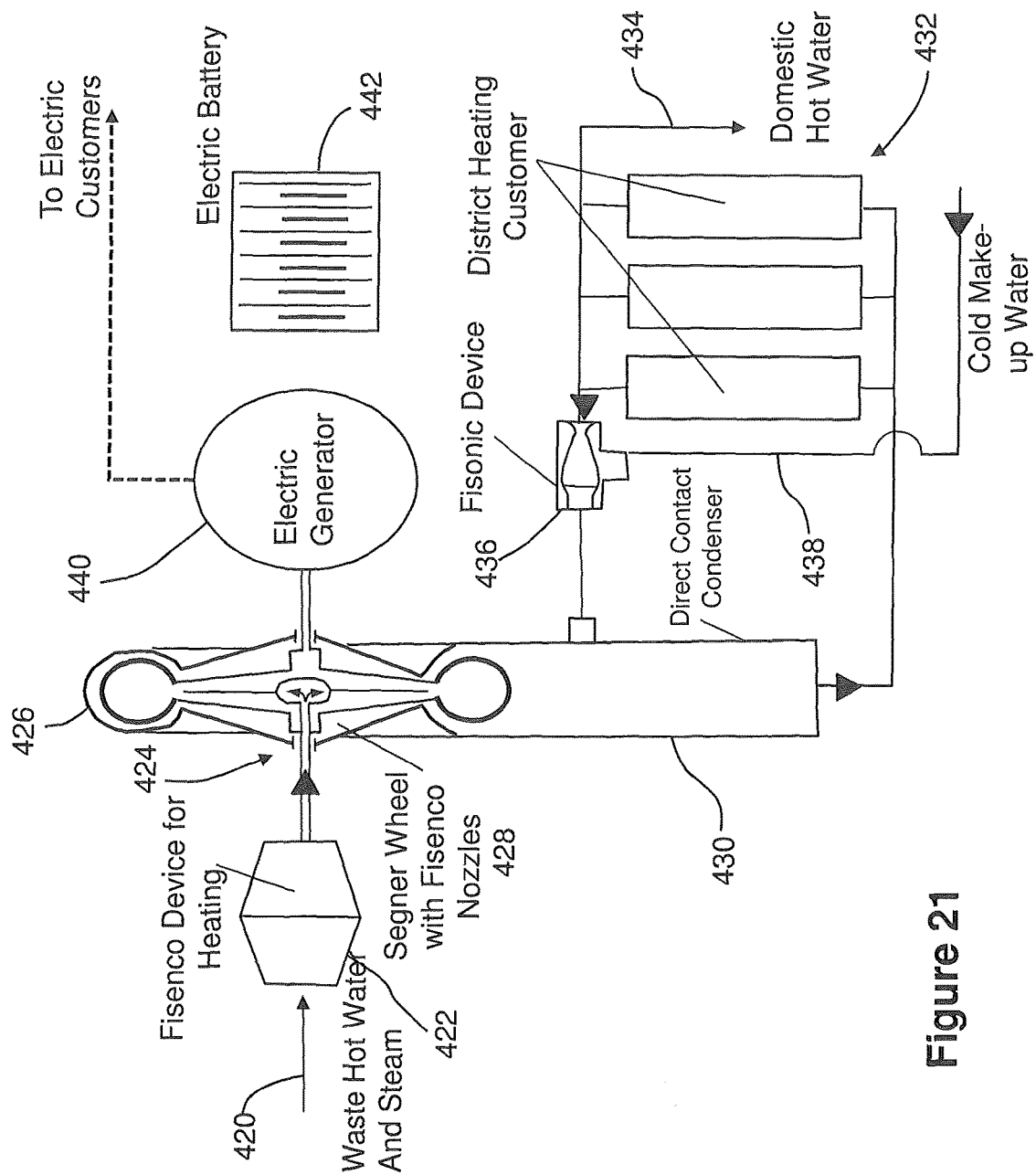
FIG. 21 is a schematic view of a transonic two-phase reaction turbine and heat exchanger, depicted in single-line flow diagram form, in accordance with an embodiment of the invention.

Referring now to FIG. 21, the operation of an embodiment of the invention is shown in single-line flow diagram form. The condensate, waste hot water, waste steam, and/or gases 420, (temperatures from 40 F to 540 F) pass through an optional initial KEH 422 (similar to KEH 20 described above) which serves to increase the water or gas pressure and temperature, resulting in a single-phase flow medium at the discharge end. In an embodiment, the KEH 422 may be the same as the FD device described in commonly owned United States Patent Publication 2012/0248213 or commonly owned United States Patent Publication 2012/0186672, which are incorporated by reference herein in their entirety.

After KEH 422, the single-phase or multiple phase flow medium are introduced through the inner or outer channels 424 to the center of the shaft and through the side of the wheel of one or multiple turbine wheels 426, which are more generally herein referred to as rotors. Example turbine wheels 426 having two-phase flow input in accordance with an embodiment of the invention are described in more detail below with reference to FIGS. 23-33. Each section of the wheel 426 is equipped with one or multiple KEHs 428. In an embodiment that utilizes optional KEH 422, the single-phase fluid flow discharge from KEH 422 provides one of two heat carriers that is fed into the wheel 426, a second heat carrier is also fed into the wheel in a manner that is described in detail below in connection with FIGS. 23-33. In the final section of the KEH 428, the two-phase supersonic flow is converted to a higher pressure reaction force, in a manner described in detail above and further below, which causes the wheel to spin and accelerate. As a result, the high pressure medium will be ejected from the nozzles at a rate of 600 to 1000 ft/sec into a direct contact condenser 430 creating reactive thrust, and spinning the shaft with an electric generator 440 coupled thereto. The produced electrical power may be used immediately, or stored in an electrical storage device, such as a batter 442.

The medium within condenser 430 may then be further used, such as in a district heating and cooling systems 432 or for domestic hot water 434. In one embodiment, a KEH 436, such as the aforementioned devices disclosed in United States Patent Publication 2012/0248213 or commonly owned United States Patent Publication 2012/0186672, may receive medium from the condenser 430 and cold make-up water 438 to generate the domestic hot water.

The integration of the wheel 426 with rotating KEHs 428 operating on any heat source, low grade liquid or gas of any pressure and temperature, and generating electricity with high thermal efficiency advantageously provides renewable advanced clean green power. This system can be used for building, industry, solar and other waste energy recovery.

The KEHs are supersonic, condensing heat pumps, with an internal geometry that causes steam, water or other gases and liquids to mix and accelerate, converting a minute fraction of a fluid's thermal energy to physical thrust (pump head) with the outlet pressure being higher than the pressure of the working medium at the inlet of the nozzle.

Figure 22:
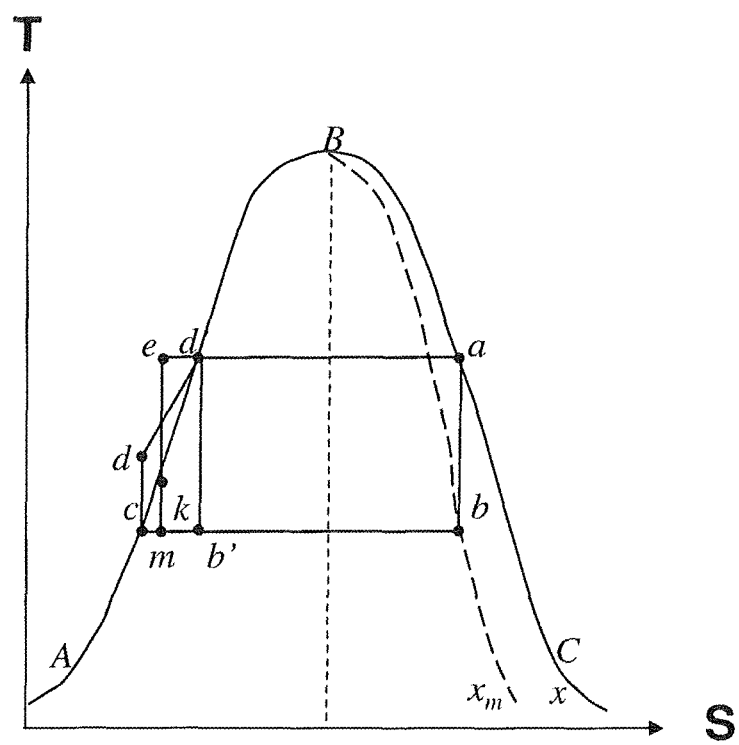
FIG. 22 is a graphical plot of a Rankine cycle in accordance with an embodiment of the invention.

Embodiments of the invention overcome the limitation of existing systems by substantially increasing the electric generation efficiency, as illustrated in FIG. 22, which presents a comparison of a proposed cycle with an existing cycle utilizing a conventional steam turbine.

Indicated in FIG. 22 as "a-b-c-d-d'" is an ideal Rankine cycle without superheat. The position of point "b" is determined by the maximum allowable degree of dryness of the steam.

Embodiments of the invention overcome the limitation of existing steam turbines. It is well known that for steam turbines with modern blades the required steam dryness should be 88 to 92%. At higher humidity, irreversible losses are rapidly increased, and the dynamic load on the blades associated with the nonequilibrium flow is also increased. As a result, the turbine operates with low internal efficiency. Thus, the expansion of saturated steam in the steam turbine is limited by curves X and BC. In the exemplary embodiment, the expansion process begins from the lower boundary curve (corresponding to d'-b' on FIG. 22). The thermodynamic cycle in which the turbine operates corresponds to the contour of d'-b'-c-d-d'. If the working fluid in front of the turbine is not heated to the saturation temperature, the working process will correspond to the line e-k-m, and first the device will operate as a purely hydraulic device, and after reaching the state of point 'k', as a hydro-steam device. If the change in heat capacity is neglected, the ideal proposed cycle in the T-S diagram is represented in the form of a right triangle c-k-m-c. The thermodynamic analysis indicates that the electric generation efficiency of such cycle may reach 60 to 70%.

An embodiment of the invention allows generating electric power utilizing waste water or gas without use of fossil fuels and associated pollution. The vast amount of waste water and gases from various industries currently released to the environment will become the source of environmentally clean, renewable generation of electric power and heat supply.

Embodiments of the invention can also be used as a desuperheater device, combining the working stream with various waste steam streams, resulting in a substantial energy advantage over an existing desuperheater devices.

Embodiments of the invention can also be used as water coolers, preheating water for power plants and various industries while generating electricity.

Embodiments of the invention can also be used as a reliable electric generating device for emergency power supply or cooling in nuclear power plants.

Embodiments of the invention can also be used as a pump that is attached to a shaft utilizing its power and has the ability to pump two-phase liquids that represent the bulk of the fluids used in the generation industry and minimize energy losses in the condensers.

In an embodiment, the low temperature or high temperature medium is received from, but is not limited to: waste water (heat recovery from cooling towers, condensers, exhaust and waste streams from industry), steam, gas, various fluids, chemicals, particles or their combination.

Embodiments of the invention may be used for obtaining green mechanical energy with minimum thermodynamic losses for driving electric generators, pumps, compressors, heat pumps and producing thermal energy, reducing the heat discharge to the environment.

Embodiments may be further used with primary movers such as steam and water turbines, gas turbines and reciprocating engines producing electricity as a by-product of heating water.

In still further embodiments, the engine and heat exchanger may be used for electric, heating, cooling, pumping, metering, mixing, combustion, cleaning, hydraulic fracturing of deep shale rocks, emulsion, solar systems, environmental protection, chemical and nuclear reactors applications for pumping and cooling.

In an embodiment, the internal molecular bindings of the working medium are broken when passing through the reaction in the KEH. In an embodiment, the passing of the working medium through KEHs increases the medium discharge pressure and temperature. Thereafter the medium is introduced through the inner channel to the center of the wheel and or through a seal side nozzle connection to the drum of the wheel. Each branch of the wheel is provided with KEHs. The wheel begins to spin increasing the centrifugal force of the fluid entering the wheel drum creating higher pressure to the drum and speed to the KEH. The working medium pressure in the wheel branches rises, flow accelerates, gets into the area of low pressure in the expanding part of the KEHs and intensively boils. As a result the supersonic single-phase jet exiting at high pressure and velocity from the KEHs accelerating at the rate of 600 to 1000 ft/sec into a direct contact condenser that creates reactive trust, spinning of single or multiple shafts. The condensed steam creates vacuum and the enclosure is under lower than the atmospheric pressure, resulting in reduction of friction losses in the turbine. The turbine pulley is operating as a pump removing the water to complete the turbine cycle, or heat supply to heat exchanger, boiler, district heating system, and other users In an embodiment, obtaining mechanical energy is achieved with minimum thermo dynamical losses by increasing the efficiency due to maximum use of multiple waste streams of thermal and kinetic energy of the useful working medium, flowing out from the KEHs of the turbine. This embodiment can also include an outer casing around the wheel, equipped with concave or other formed blades, and rotated by flow entering through the casing openings, providing additional mechanical energy. Because of the reactive forces exerted on the wheels, they will rotate in opposite directions. The energy can be controlled by electrical load coefficient exerted on two turbine wheels to provide the outer wheel is rotating with lower speed than the inner wheel. In order to recognize maximum efficiency, the main inner wheel shaft is connected to a generator rotor, and the second outer wheel is connected to the generator stator.

Embodiments of the invention further solve the problem of increasing of mechanical energy obtained in the turbine by increasing the efficiency due to minimal losses of energy during throwing out of a working medium from the KEHs, and also a simplification of the construction of the turbine. The described system can use a vertical or horizontal turbine arrangement.

Embodiments of the invention may further be integrated with a solar system, a heat pump or supplementary boiler for efficient generation of heating, domestic hot water, cooling and electricity.

Embodiments of the invention may further be used as a scrubber for cleaning various liquids and gases from particles and smoke.

Embodiments of the invention may further be used as a preheater, superheaters in power plants, boiler rooms, condensers, feedwater heaters, pressure regulating valves (PRV), and flow meters.

Embodiments of the invention may further be used in various chemical processes for separation of various components and emulsions.

Embodiments of the invention may further be used in combination of centrifugal separators for generation of electric and thermal energy from geothermal fluids.

Embodiments of the invention may further be used for operation of emission control devices.

Embodiments of the invention may further be operated as: a steam compressor for increasing the pressure of low pressure steam streams; a two-phase pump for cooling nuclear reactors; a mixing reactor; a device for creation of bubbles in a two-phase mixture for generation of thermal energy; a solar activated pump; an expander for cooling supply; a condenser for power plant operation; a compressor for power plant operation; a reactor for coal slurry; a reactor for coal slurry; an emulsion mixer; a burning nozzle with low pollutant emission; a deaerator; a water recovery device; a coal gasification device; and in various chemical processes for combining of various components and emulsions.

Reference is now made to FIGS. 23-32, which depict example embodiments of a direct drive thermo-kinetic turbine generator in accordance with an embodiment of the invention, where like elements are numbered alike.

In general, the turbine generator has an inner wheel that is configured to rotate in a first direction, clockwise for example, and an outer wheel that is configured to rotate in a second direction opposite to the first direction, counterclockwise for example. The inner wheel has spoke-like fluid flow channels with the outer ends being equipped with one or more KEHs, similar to embodiments of the KEH 20 described above. Water and steam enter the spoke-like fluid flow channels via flow ports proximate the rotational axis of the inner wheel, combine in the KEH in the manner described above to form single-phase flow, and exit the respective KEHs with elevated thrust causing the inner wheel to rotate in reaction to the elevated thrust of the exiting single-phase stream. The outer wheel has a plurality of blades, or vanes, distributed around an inner surface of the outer wheel in close proximity to the exit region of the one or more KEHs. In further reaction to the elevated thrust of the exiting single-phase stream of the one or more KEHs impinging upon the plurality of blades, the outer wheel rotates in opposition to the rotation of the inner wheel. The inner and outer wheels are separately connected to respective shafts which may be further connected to an electric generator, compressor, pump, or other device capable of producing mechanical and/or electrical energy.

Figure 23:
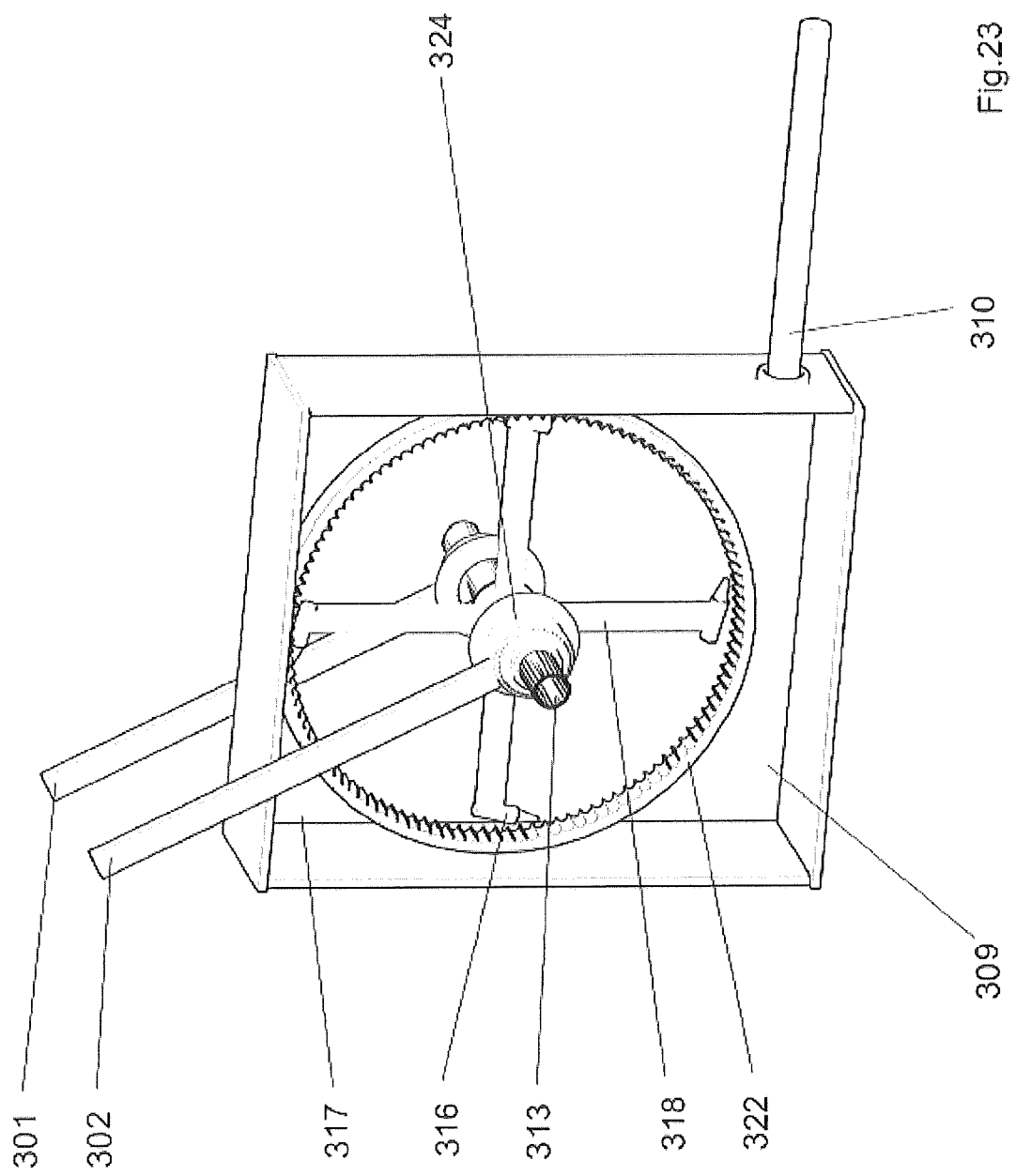
FIGS. 23-32, 33A, 33B and 33C depict alternative embodiments of a direct drive thermo-kinetic turbine generator in accordance with an embodiment of the invention.

In the embodiment of FIG. 23, water 301 and steam 302 enter the turbine drum chamber 325 from opposite sides via lateral seal bearings 324. Afterwards steam and water enter via separate spoke-like fluid flow channels 318 into two-phase KEHs 316 (similar to embodiments of the KEH 20 described above). The KEHs discharge single phase fluid impacting the surrounding blades of the outer wheel 322. The reaction forces cause rotation of the outer wheel 322 in an opposite direction of the main turbine (i.e., inner wheel). The resulting heated discharge water is collected at the bottom of tank 309 and supplied via pipe 310 to a heating system of a customer. In an embodiment, the shaft 313 is connected to an electric generator, compressor, pump or other device capable of producing mechanical and/or electrical energy. The turbine is located in housing 317. The drum 325 is interconnected to fluid supply by the lateral seal bearings 324.

Figure 24:
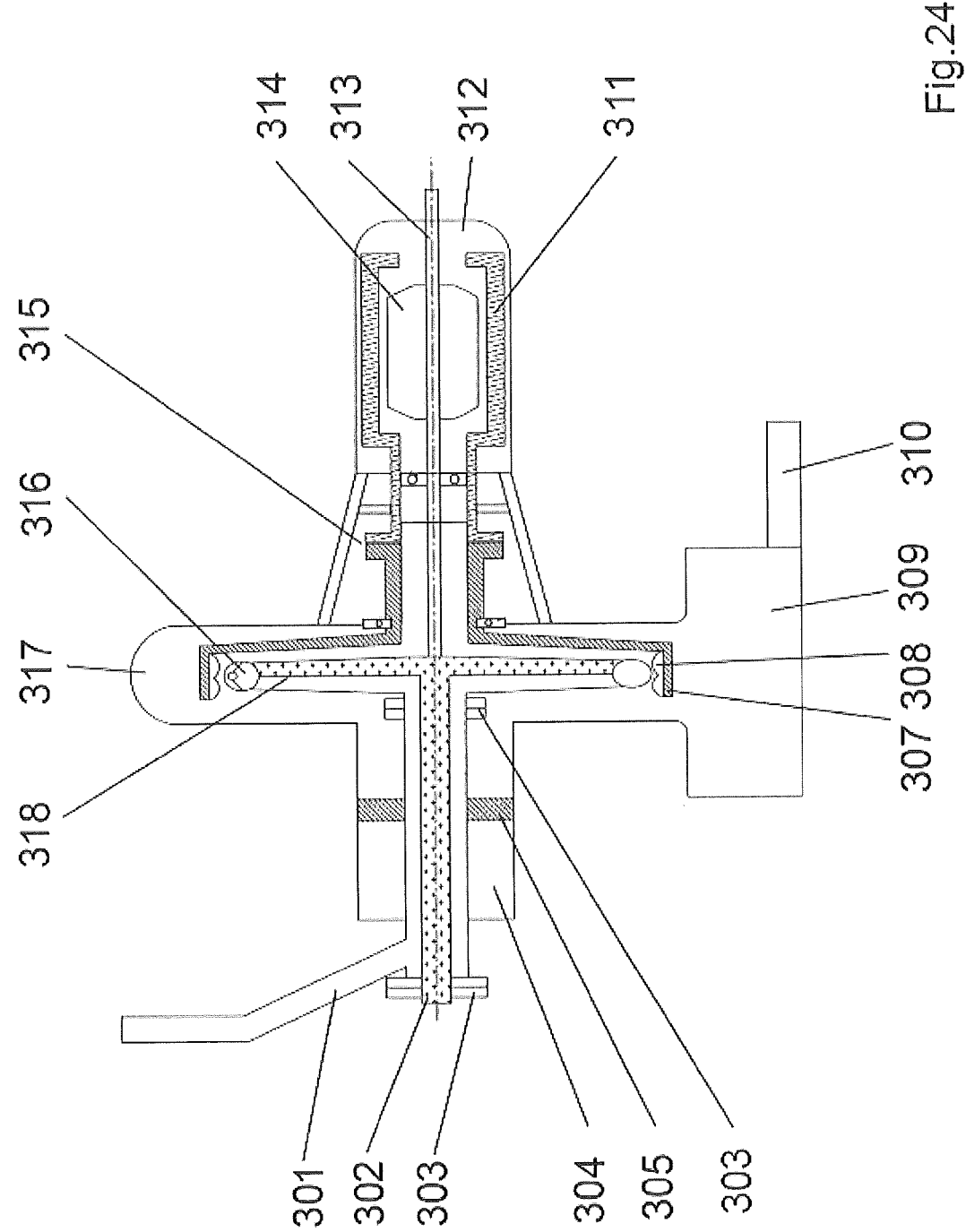

In the embodiment of FIG. 24, the water and steam enter the inner wheel via drum seal bearings 303 into housing 304. The housing 304 is equipped with stabilizing legs and ribs 305. Outer wheel 307 is coupled to a stator 311 by a linkage flange 315. In an embodiment, the outer wheel 307 is equipped with modified Pelton blades 308. The resulting heated discharge liquid is collected in the tank 309 and supplied via pipe 310 to a heating system. The generator 312 consists of a rotor 314, the stator 311, and a shaft 313. The turbine inner wheel 318 is equipped with two phase KEHs 316 (similar to embodiments of the KEH 20 described above). The turbine, consisting of the inner and outer wheels, is located in housing 317.

Figure 25:
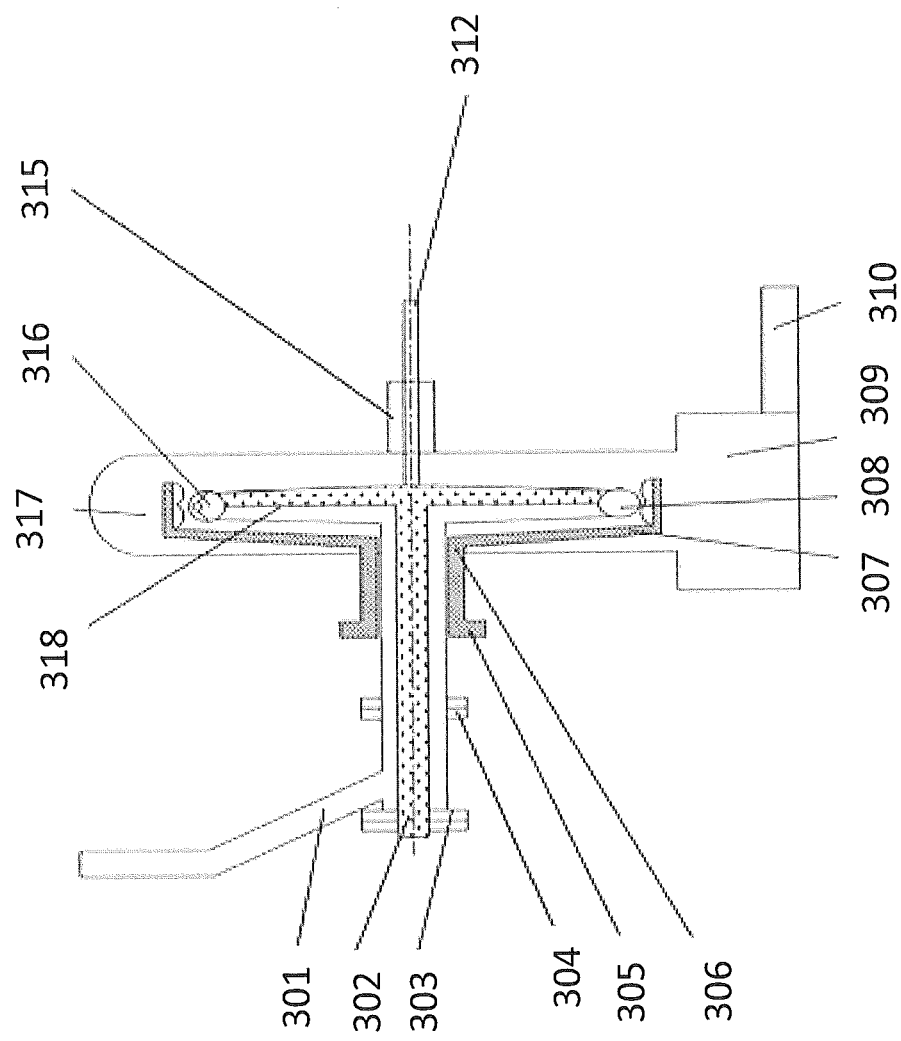

In the embodiment of FIG. 25, which is similar to that of FIG. 24, the outer wheel 307 is stationary, while the shaft 312 is configured to drive an electric generator, compressor, pump or other device capable of generating mechanical and/or electrical energy.

Figure 26:
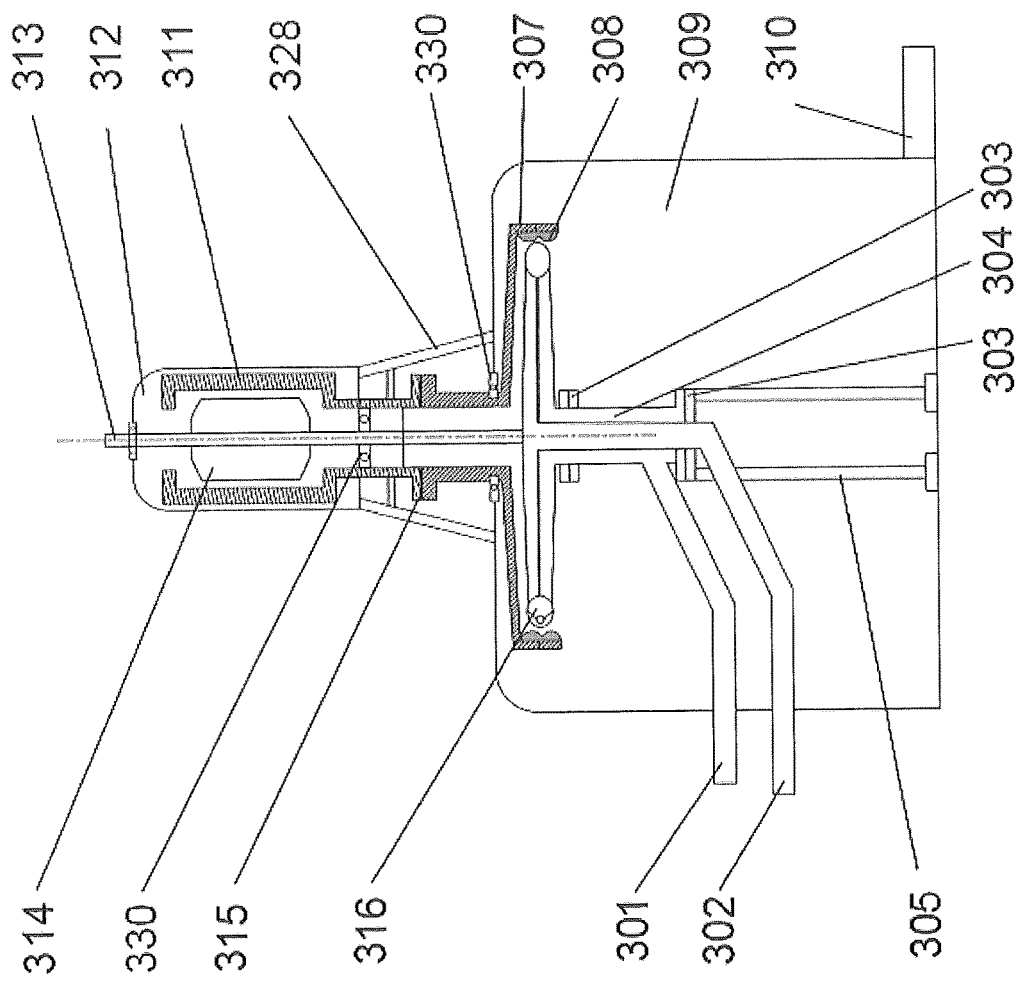

In the embodiment of FIG. 26, which is similar to that of FIG. 24, the rotational axis of the turbine wheels are oriented vertically as opposed to horizontally, with the rotational axis of the generator also being oriented vertically.

Figure 27:
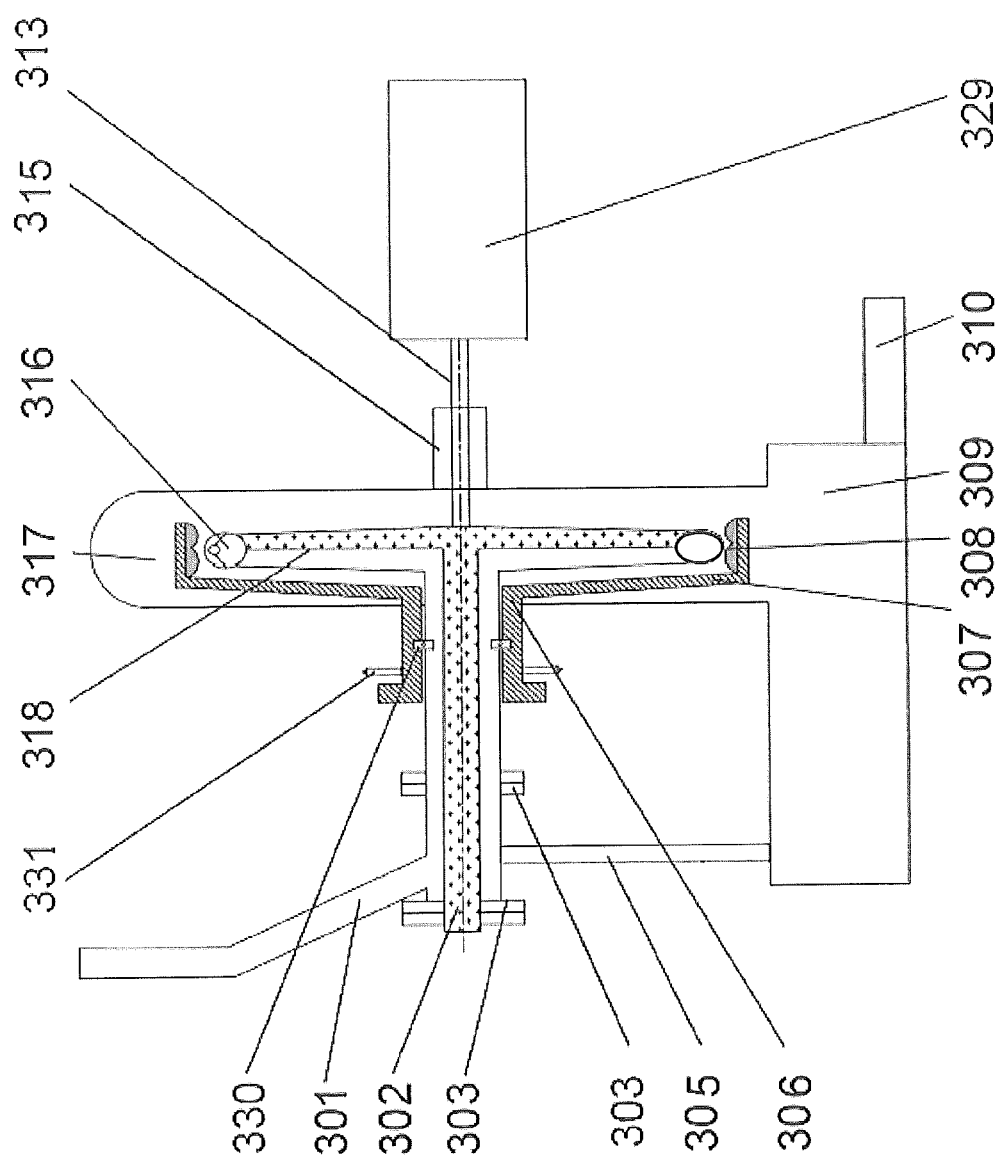

The embodiment of FIG. 27 is similar to that of FIG. 25 but where the stationary outer wheel 307 has modified Pelton blades 308.

Figure 28:
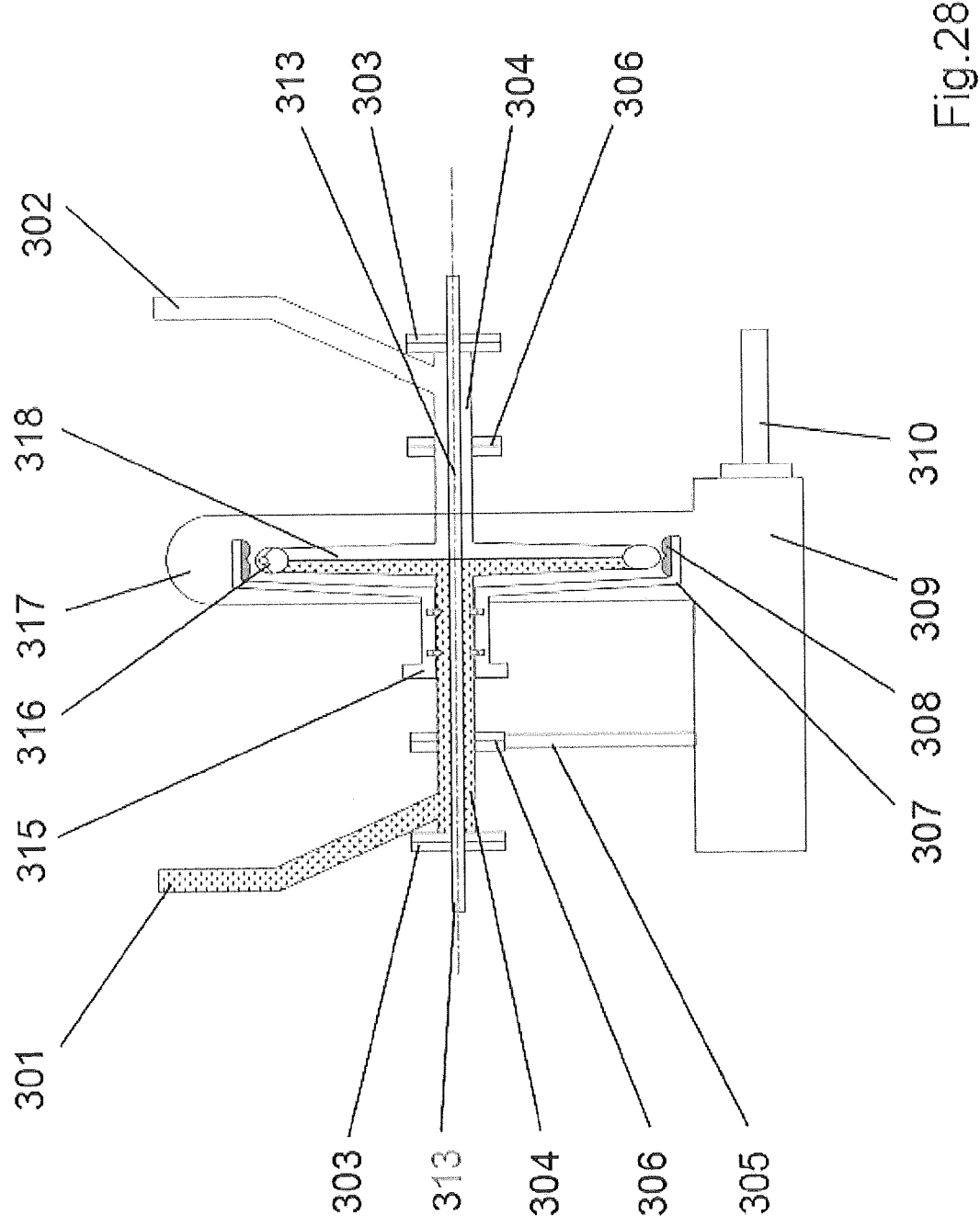

In the embodiment of FIG. 28, which is also similar to that of FIG. 25, the outer wheel 307 is configured to rotate to drive a compressor, pump or other mechanical device coupled to linkage flange 315, while the inner wheel 318 is configured to rotate to drive another compressor, pump or other mechanical device coupled to the shaft 313.

Figure 29:
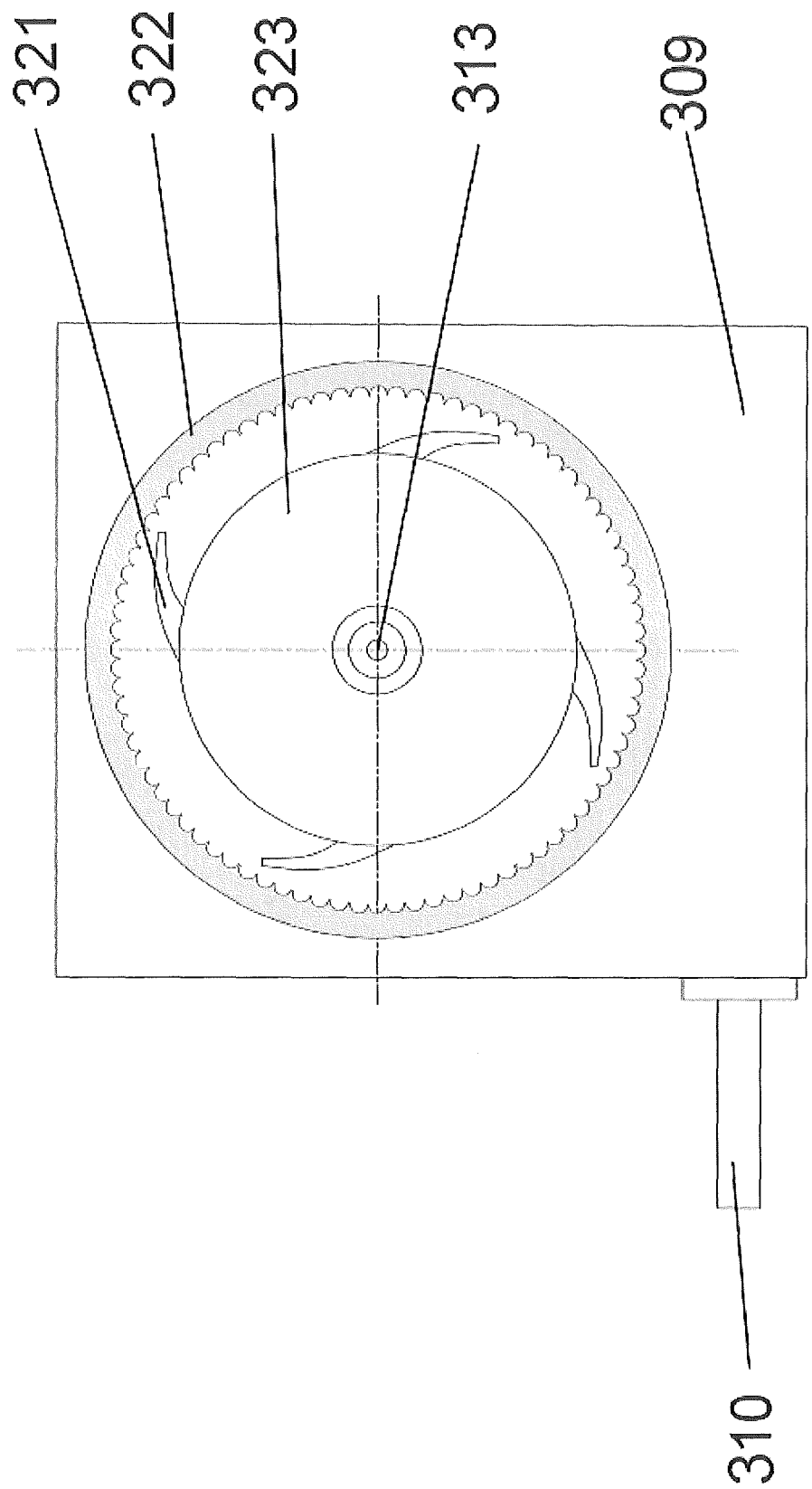

In the front view embodiment of FIG. 29, the inner wheel 323 is more clearly shown equipped with a plurality of tangential two-phase KEHs 321 having respective exit flow streams disposed to impact the blades of the outer wheel 322.

Figure 30:
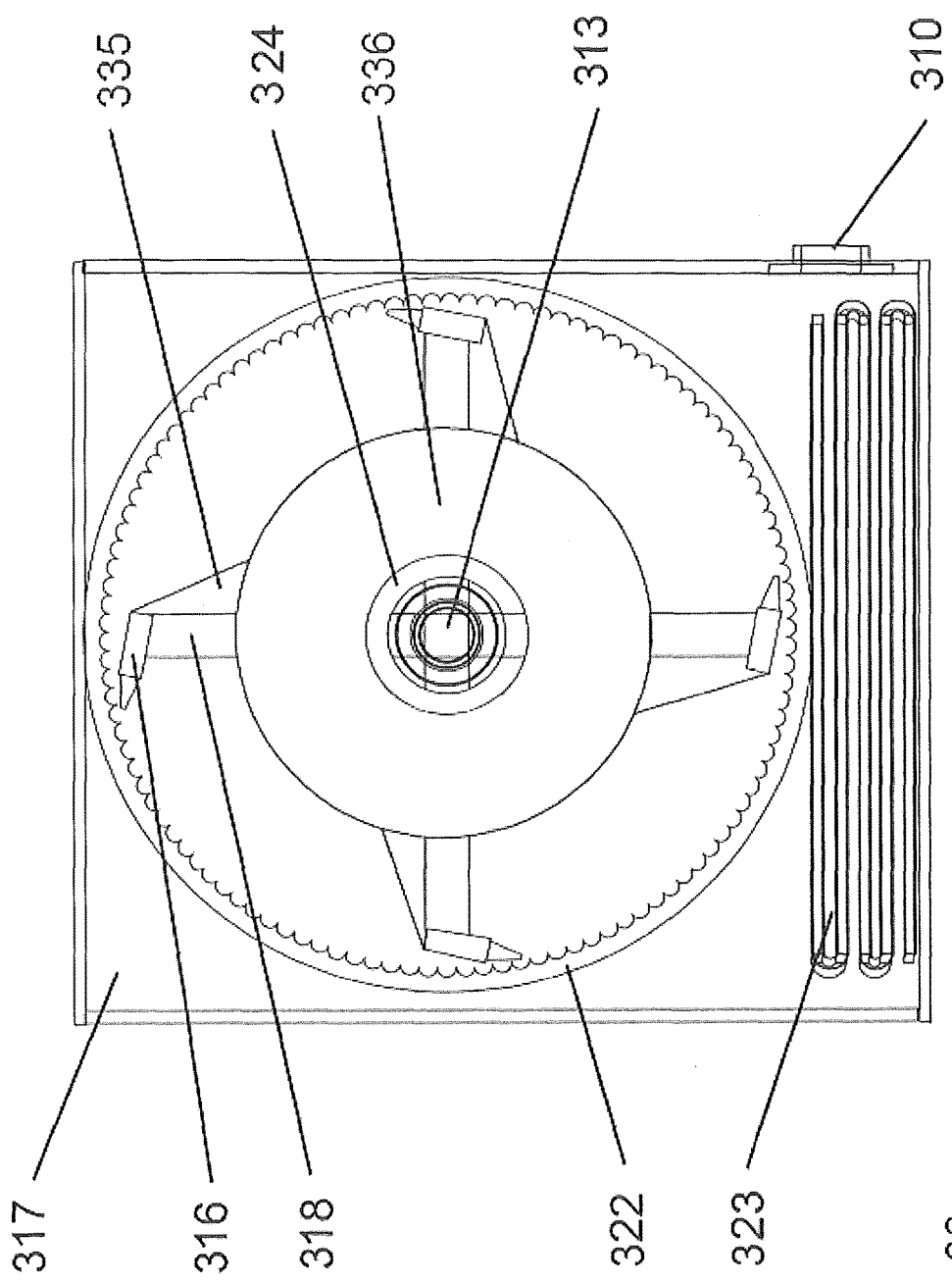

The front view embodiment of FIG. 30 is similar to that of FIG. 25 but wherein the bottom of the collection tank 309 there is installed a tubular heat exchanger 323 for heating water for a building.

Figure 31:
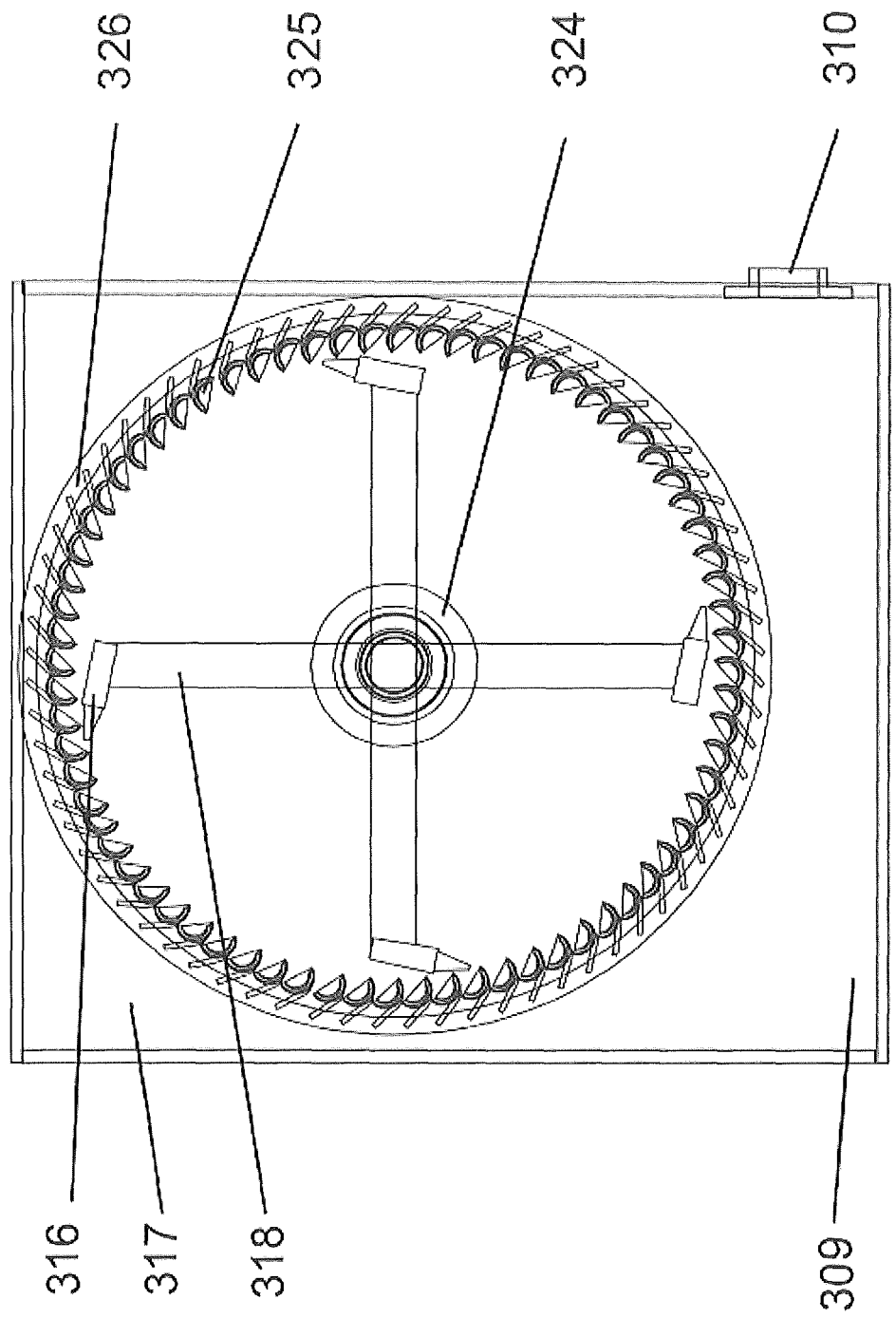

The embodiment of FIG. 31 is similar to that of FIG. 25 but with the outer wheel being equipped with reflecting blades having a different shape.

Figure 32:
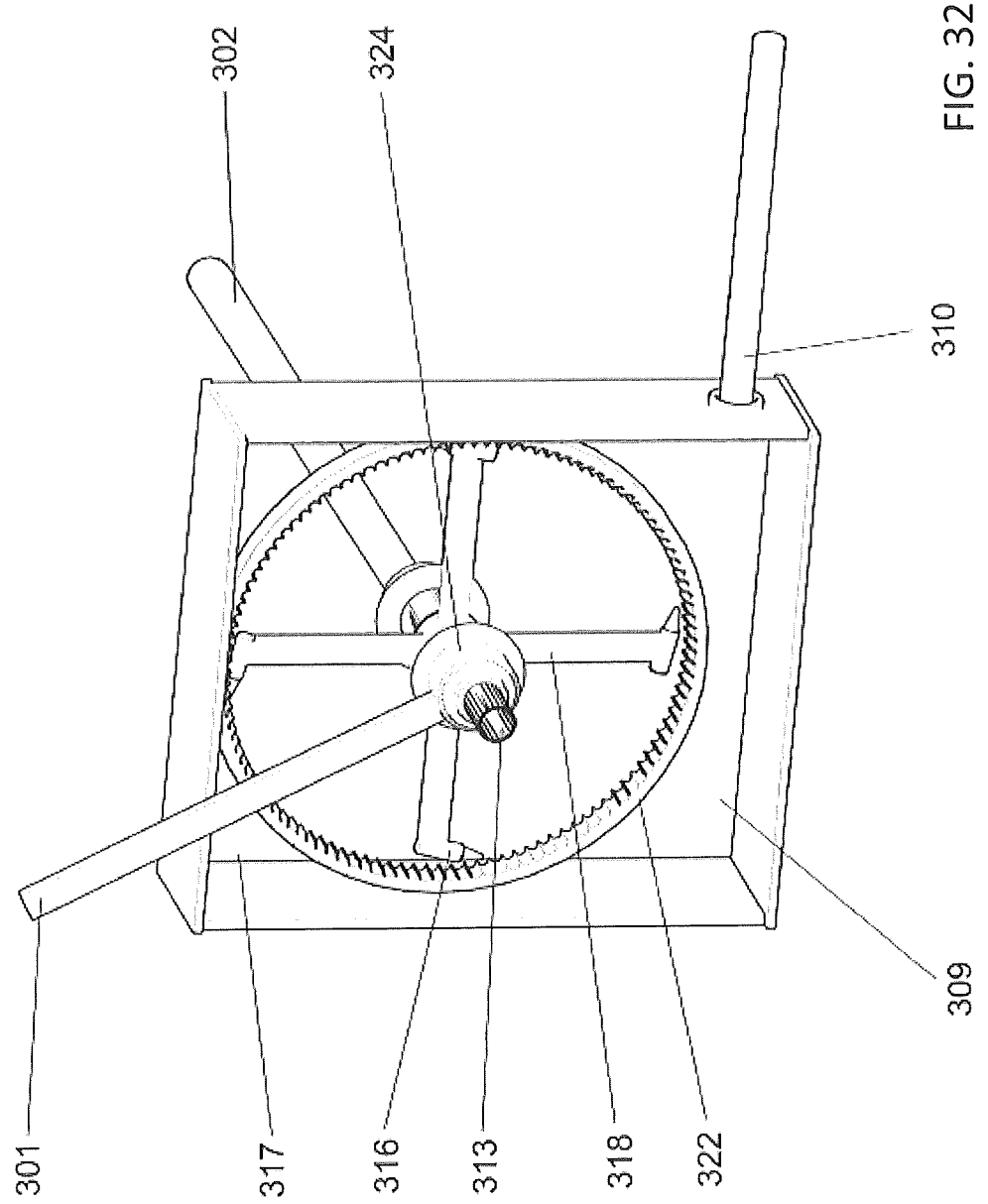

The embodiment of FIG. 32 is similar to that of FIG. 23 but has center supply of steam 302 coupled with a seal bearing to the turbine. The water supply 301 has a lateral seal bearing 324 and direct drive shaft 313.

Figure 33C:
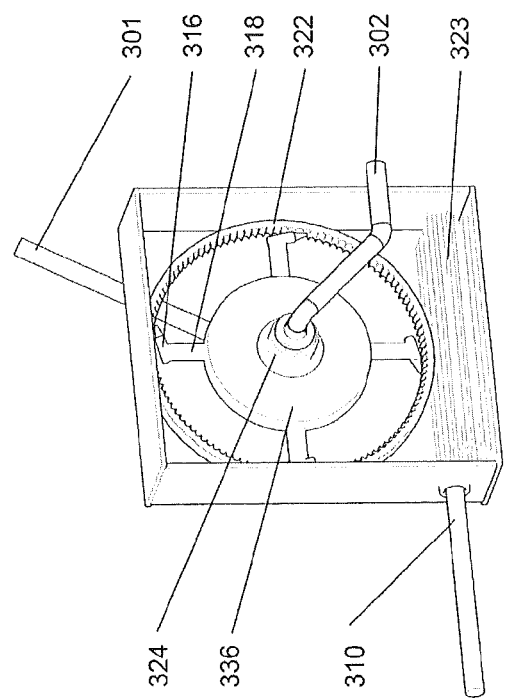
Figure 33A:
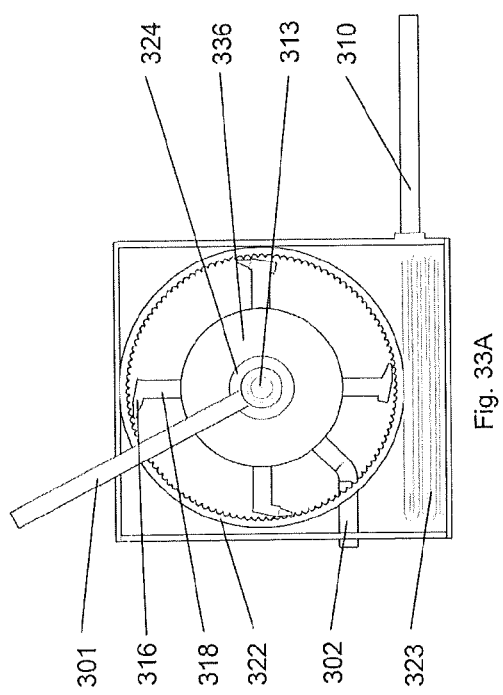
Figure 33B:
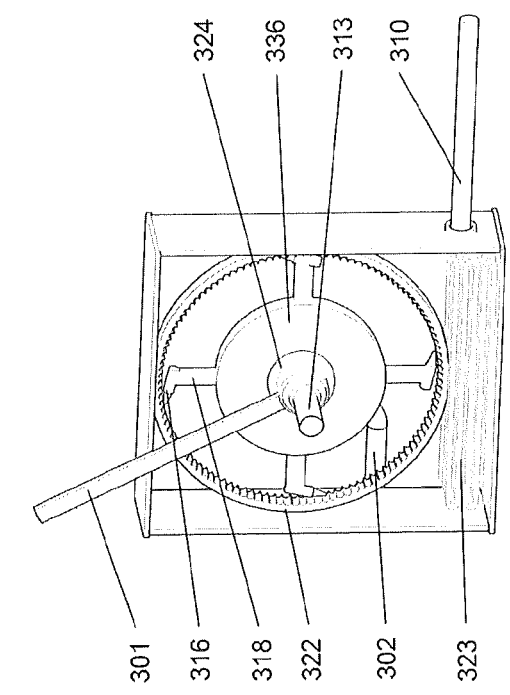

The embodiments of FIGS. 33A, B and C illustrate the various design configurations of the turbines.

Figure 34:
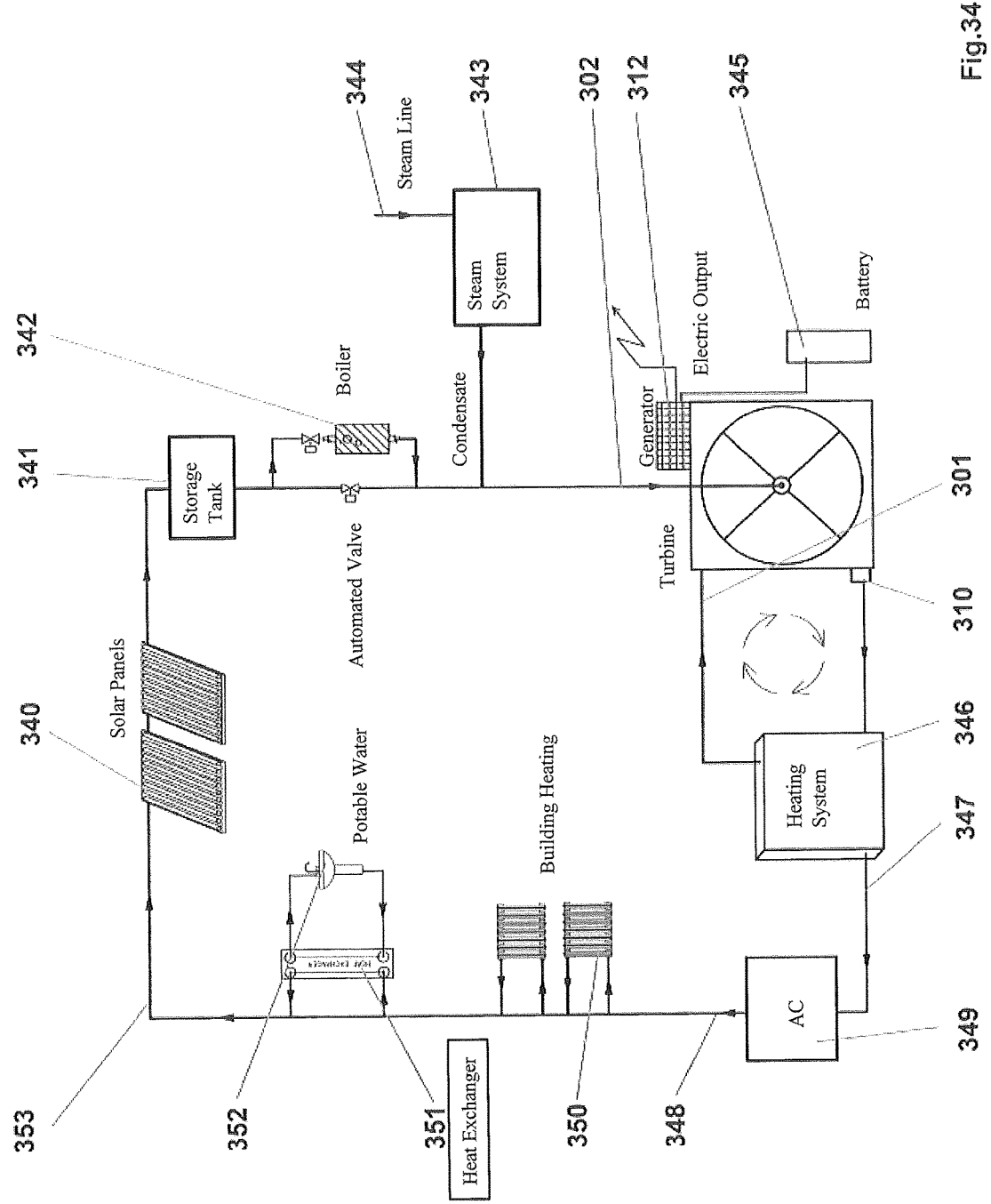
FIG. 34 depicts various sources of thermal energy for use in accordance with an embodiment of the invention.

The embodiment of FIG. 34 depicts various sources of thermal energy feeding the turbine including solar thermal 340, storage tank 341, fossil fuel boiler 342, and a steam system, and also depicts end-users: electric, heating and air conditioning systems.

Figure 35:
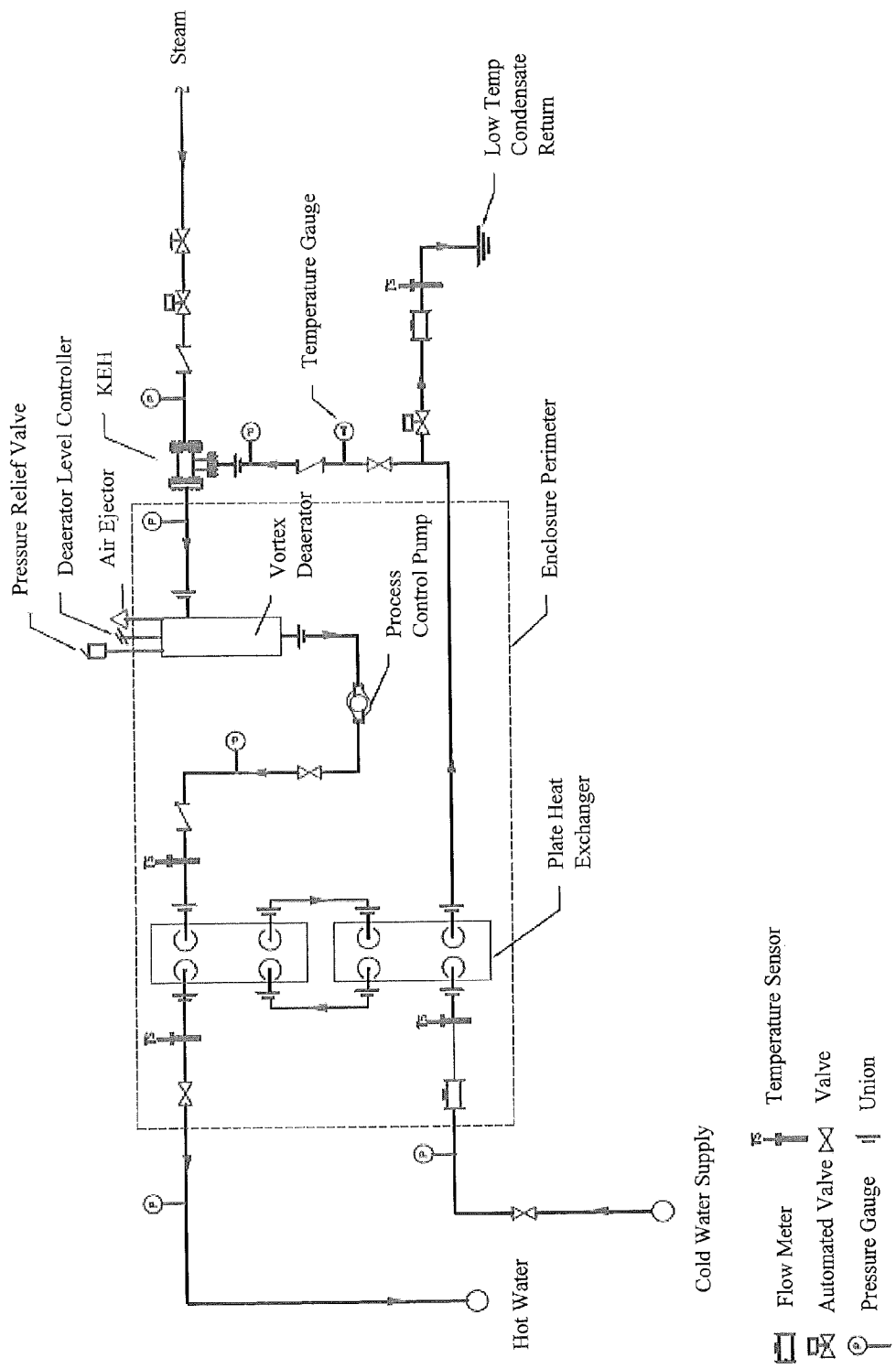
FIG. 35 depicts an indirect hot water system for use in accordance with an embodiment of the invention.

The embodiment of FIG. 35 depicts an indirect hot water system supplied with steam via a two-phase nozzle, a vortex type deaerator, a process control pump and a plate and frame heat exchanger.

An embodiment of the above described transonic two-phase reaction turbine is operable to obtain mechanical energy achieved with minimal thermo-dynamical losses by increasing the efficiency due to maximum use of multiple waste streams of thermal and kinetic energy of useful working medium flowing out from the kinetic energy harvesters of the turbine.

An embodiment of the above described transonic two-phase reaction turbine is operable to solve the problem of increasing of mechanical energy obtained in the turbine by increasing the efficiency due to minimal losses of energy during throwing out of a working medium from the KEHs, and also in the simplification of the construction of the turbine.

As can be seen from the foregoing, the scope of the invention is not limited to one particular embodiment, but encompasses all embodiments falling within the ambit of the claims.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A transonic two-phase reaction turbine, comprising:
at least one rotor comprising a plurality of kinetic energy harvesters;
wherein each kinetic energy harvester is disposed and configured to receive a first heat carrier or heat carriers under pressure into a first nozzle, and to receive a second heat carrier into a second nozzle, the second heat carrier being colder than the first heat carrier, the second nozzle being disposed downstream of the first nozzle at a defined distance based at least in part on a flow, pressure and temperature of the heat carrier or heat carriers;
wherein each kinetic energy harvester comprises a mixing chamber between the first nozzle and the second nozzle configured to mix the first heat carrier and the second heat carrier to produce a two-phase mixture, the second nozzle being placed at the defined distance from the first nozzle for producing an elevated discharge thrust;
wherein each mixing chamber is configured to cause a pressure drop and deceleration of the heat carriers of the two-phase mixture to a velocity at which the two-phase mixture or at least one of the first heat carrier or the second heat carrier, or both, boils into a homogeneous two-phase medium with small bubbles, being highly compressible medium and with sonic condition of Mach number of more than 1;
wherein each second nozzle is configured to converge and compress the two-phase medium flow, collapsing the small bubbles and changing the two-phase mixture into a non-compressible single-phase flow medium having increased kinetic thrust;
wherein each kinetic energy harvester further comprises a discharge section disposed downstream of the second nozzle, each discharge section being disposed and configured to discharge the single-phase flow medium having increased kinetic thrust to produce a reactionary pressure, higher than both input pressures of the first and second heat carriers, to drive the rotor in a rotational manner;

wherein as a result each kinetic energy harvester produces thermal and kinetic energy.

2. The transonic two-phase thermal reaction turbine of claim 1, wherein:
the at least one rotor comprises one or multiple inner wheels, each inner wheel equipped with a plurality of kinetic energy harvesters configured to discharge higher pressure fluid via a converging discharge section.

3. The transonic two-phase reaction turbine of claim 1, wherein:
the at least one rotor comprises feed ports for receiving the first heat carriers and the second heat carriers.

4. The transonic two-phase reaction turbine of claim 3, wherein:
the at least one rotor comprises a hollow conduit shafts comprising the feed ports for receiving the first heat carriers and the second heat carriers.

5. The transonic two-phase reaction turbine of claim 3, wherein:
the at least one rotor comprises a combination of hollow and solid shafts, and further comprises the feed ports axially offset from the combination of hollow and solid shafts for receiving the first heat carriers and the second heat carriers.

6. The transonic two-phase reaction turbine of claim 1, wherein:
each discharge section is disposed in fluid communication with condensers or heat exchangers, wherein the single-phase flow medium discharged to the condensers may be further used for heating; and the rotors and gears are disposed in operable communication with electric generators, compressors, pumps and other mechanical devices performing mechanical work, wherein the reactionary torque to drive the rotor in a rotational manner facilitates production of electrical power via the electric generators.

7. The transonic two-phase reaction turbine of claim 2, wherein:
each kinetic energy harvester is configured to increase the pressure and temperature of the working medium;
wherein the medium is introduced through a receiving chamber and inner channel to the center of the inner wheels or through lateral seal bearing connections to a chamber drum of the wheel;
tangential sections of the wheels are provided with one or multiple of the kinetic energy harvesters;
the wheel is configured to spin, increasing the centrifugal force of the heat carriers that enter the wheel, creating higher output pressure and flowrate of the one or more heat carriers, causing a rise of pressure of the one or more heat carriers in the spokes of the wheels, causing flow acceleration into the mixing chamber of kinetic energy harvesters, which causes an exchange of energy between the first and second heat carrier in an mixing chamber of the kinetic energy harvesters, and intensive boiling of the one or more heat carriers;
the single-phase flow medium that exits at high pressure and velocity from the discharge section accelerates into a direct contact condenser that is configured to create reactive thrust in the turbine, and to rotate one or multiple shafts; and
a pulley of the turbine is configured to operate as a pump to remove discharge water from a torus of a housing of the turbine to complete the turbine cycle, or supply heat to heat exchangers, boilers, district heating systems, or other users.

8. The transonic two-phase reaction turbine of claim 2, further comprising:
an outer wheel axially disposed around the inner wheel, the outer wheel being equipped with blades disposed to receive the discharged higher pressure fluid from the plurality of kinetic energy harvesters, the outer wheel configured to counter rotate in relation to the inner wheel in reaction to the discharged higher pressure fluid, providing additional mechanical energy;
wherein resulting reactive forces exerted on the inner and outer wheels rotate the inner and outer wheels in opposite directions;
wherein, output energy created by the rotating inner and outer wheels is controlled by an electrical load coefficient exerted on the inner and outer wheels resulting in the outer wheel rotating with a lower speed than the inner wheel;
wherein, the inner wheel shaft is coupled to a generator rotor, and the outer wheel is coupled to a stator of the generator;
wherein, rotational axes of the inner wheel, the outer wheel, the rotor, and the stator, are disposed in either a vertical arrangement or a horizontal arrangement.

9. The transonic two-phase reaction turbine of claim 8, further comprising at least one of a solar electric-generation system, a heat pump or supplementary boiler for efficient generation of heating, domestic hot water, cooling and electricity, operably connected to the transonic two-phase reaction turbine.

10. The transonic two-phase reaction turbine of claim 8 operable in accordance with one or more of the following: as a scrubber for cleaning various liquids and gases from particles and smoke; with an integrated heat pump for efficient generation of heating, domestic hot water, cooling and electricity; as a preheater in power plants and boiler rooms, generating electricity to offset the electric parasitic loads; in various chemical processes for separation of various components and emulsions, oil recovery and fire extinguishing systems, and for utilizing exhaust from machinery, generators, and cooling systems; in combination with centrifugal separators for generation of electric and thermal energy from geothermal fluids; for operation of emission control devices; as a preheater, superheaters in power plants, boiler rooms, condensers, feedwater heaters, pressure regulating valves (PRV), pumps, air conditioning, pumps in fossil and nuclear power plants, feedwater heaters and deaerators, and flow meters; as a steam compressor for increasing the pressure of low pressure steam streams; a two-phase pump for cooling nuclear reactors; a mixing reactor; a device for creation of bubbles in a two-phase mixture for generation of thermal energy; a solar activated pump; an expander for cooling supply; a condenser for power plant operation; a compressor for power plant operation; a reactor for coal slurry; an emulsion mixer; a burning nozzle with low pollutant emission; a deaerator; a water recovery device; a coal gasification device; and in various chemical processes for combining of various components and emulsions; to break internal molecular bindings of the heat carrier medium passing through the reaction in the kinetic energy harvester; to use waste water in the form of heat recovery from cooling towers, condensers, exhaust and waste streams from industry, steam, gas, various fluids, chemicals, particles or their combination, for obtaining green mechanical energy with minimum thermodynamic losses for driving electric generators, pumps, compressors, and heat pumps, and for producing thermal energy, while reducing the heat discharge to the environment; to use as primary movers steam and water turbines, gas turbines and reciprocating engines producing electricity as a by-product of heating water; to use turbine exhaust in internal combustion turbines, reciprocating engines and energy recovery boilers, steam traps, various exhausts from buildings and industry; for use as an engine and heat exchanger for electric, heating, cooling, pumping, metering, mixing, combustion, cleaning, hydraulic fracturing of deep shale rocks, emulsion, environmental protection, chemical and nuclear reactor applications for pumping and cooling; as a desuperheater and a superheater.

11. The transonic two-phase reaction turbine of claim 7 operable to cause the working medium pressure in branches of the wheel to rise, wherein flow accelerates, moving into an area of low pressure in an expanding part of the kinetic energy nozzle and intensively boiling, resulting in discharge of supersonic single phase medium at high pressure and velocity from the discharge section that accelerates at a rate of between 600 to 1000 ft/sec into a direct contact condenser that creates reactive thrust, spinning one or more shafts.

12. The transonic two-phase reaction turbine of claim 1, wherein:
the at least one rotor comprises at least two wheels that are configured to rotate in opposite directions, at least one of the at least two wheels being equipped with one or multiples of the kinetic energy harvesters.

13. The transonic two-phase reaction turbine of claim 12, wherein:
the at least two wheels comprises an inner wheel and an outer wheel, the outer wheel configured to counter rotate in relation to a rotation of the inner wheel in reaction to a discharged high pressure fluid from the one or multiple kinetic energy harvesters.

* * * * *